(12) United States Patent
Fine et al.

(10) Patent No.: US 8,414,174 B2
(45) Date of Patent: Apr. 9, 2013

(54) ILLUMINATION APPARATUS

(75) Inventors: Eran Fine, Tel-Aviv (IL); Noam Meir, Herzlia (IL)

(73) Assignee: Oree, Inc., Ramat Gan (IL)

( * ) Notice: Subject to any disclaimer, the term of this patent is extended or adjusted under 35 U.S.C. 154(b) by 0 days.

(21) Appl. No.: 13/289,442

(22) Filed: Nov. 4, 2011

(65) Prior Publication Data

US 2012/0155113 A1 Jun. 21, 2012

Related U.S. Application Data

(63) Continuation of application No. 11/921,305, filed as application No. PCT/IL2006/000667 on Jun. 7, 2006, now Pat. No. 8,128, 272.

(60) Provisional application No. 60/687,865, filed on Jun. 7, 2005.

(51) Int. Cl.
*F21V 9/16* (2006.01)

(52) U.S. Cl. ......... 362/607; 362/606; 362/230; 362/231

(58) Field of Classification Search .......... 362/606–608, 362/230, 231
See application file for complete search history.

(56) References Cited

U.S. PATENT DOCUMENTS

| | | | |
|---|---|---|---|
| 3,261,356 A | 7/1966 | Wallace | |
| 3,626,471 A | 12/1971 | Florin | |
| 3,871,747 A | 3/1975 | Andrews | |
| 3,995,934 A | 12/1976 | Nath et al. | |
| 4,551,129 A | 11/1985 | Coleman et al. | |
| 4,669,467 A | 6/1987 | Willett et al. | |
| 4,714,983 A | 12/1987 | Lang | |
| 4,762,381 A | 8/1988 | Uemiya et al. | |
| 4,783,140 A | 11/1988 | Osawa et al. | |
| 4,829,192 A | 5/1989 | Kokubu et al. | |
| 4,853,593 A | 8/1989 | Stein et al. | |
| 4,872,837 A | 10/1989 | Issalene et al. | |
| 4,878,072 A | 10/1989 | Reinten | |
| 4,903,172 A | 2/1990 | Schoniger et al. | |
| 4,906,062 A | 3/1990 | Young et al. | |
| 5,048,913 A | 9/1991 | Glenn et al. | |
| 5,061,032 A | 10/1991 | Meltz et al. | |
| 5,139,420 A | 8/1992 | Walker | |
| 5,152,686 A | 10/1992 | Duggan et al. | |

(Continued)

FOREIGN PATENT DOCUMENTS

| | | |
|---|---|---|
| CN | 2593229 | 12/2003 |
| CN | 1321344 | 6/2007 |

(Continued)

OTHER PUBLICATIONS

Allen et al., "A nearly ideal phosphor-converted white light-emitting diode" *Appl. Phys. Ltrs.* 92:143309 (2008).

(Continued)

*Primary Examiner* — Anabel Ton
(74) *Attorney, Agent, or Firm* — Bingham McCutchen LLP

(57) ABSTRACT

An illumination apparatus, comprising at least one light emitting source embedded in a waveguide material is disclosed. The waveguide material is capable of propagating light generated by light emitting source(s), such that at least a portion of the light is diffused within the waveguide material and exits through at least a portion of its surface.

12 Claims, 7 Drawing Sheets

US 8,414,174 B2
Page 2

U.S. PATENT DOCUMENTS

| | | | |
|---|---|---|---|
| 5,165,187 A | 11/1992 | Shahidi-Hamedani et al. | |
| 5,211,467 A | 5/1993 | Seder | |
| 5,281,134 A | 1/1994 | Schultz | |
| 5,425,730 A | 6/1995 | Luloh | |
| 5,535,105 A | 7/1996 | Koenen et al. | |
| 5,559,358 A | 9/1996 | Burns et al. | |
| 5,569,254 A | 10/1996 | Carlson et al. | |
| 5,580,154 A | 12/1996 | Coulter et al. | |
| 5,675,678 A | 10/1997 | Neuberger et al. | |
| 5,718,666 A | 2/1998 | Alarcon | |
| 5,813,752 A | 9/1998 | Singer et al. | |
| 5,813,753 A | 9/1998 | Vriens et al. | |
| 5,847,507 A | 12/1998 | Butterworth et al. | |
| 5,899,552 A | 5/1999 | Yokoyama et al. | |
| 5,947,588 A | 9/1999 | Huang | |
| 5,959,316 A | 9/1999 | Lowery | |
| 5,969,869 A | 10/1999 | Hirai et al. | |
| 6,016,038 A | 1/2000 | Mueller et al. | |
| 6,031,511 A | 2/2000 | DeLuca et al. | |
| 6,079,838 A | 6/2000 | Parker et al. | |
| 6,097,871 A | 8/2000 | De Dobbelaere et al. | |
| 6,155,699 A | 12/2000 | Miller et al. | |
| 6,226,440 B1 | 5/2001 | Lyons | |
| 6,275,512 B1 | 8/2001 | Fermann | |
| 6,278,106 B1 | 8/2001 | Muto et al. | |
| 6,322,225 B1 | 11/2001 | Koike et al. | |
| 6,329,444 B1 | 12/2001 | McGlothlin et al. | |
| 6,345,903 B1 | 2/2002 | Koike et al. | |
| 6,350,041 B1 | 2/2002 | Tarsa et al. | |
| 6,351,069 B1 | 2/2002 | Lowery et al. | |
| 6,356,691 B2 | 3/2002 | Seong-jin et al. | |
| 6,408,123 B1 | 6/2002 | Kuroda et al. | |
| 6,417,616 B2 | 7/2002 | Lee | |
| 6,473,554 B1 | 10/2002 | Pelka et al. | |
| 6,488,704 B1 | 12/2002 | Connelly et al. | |
| 6,491,443 B1 | 12/2002 | Serizawa et al. | |
| 6,501,100 B1 | 12/2002 | Srivastava et al. | |
| 6,501,102 B2 | 12/2002 | Mueller-Mach et al. | |
| 6,504,301 B1 | 1/2003 | Lowery | |
| 6,522,065 B1 | 2/2003 | Srivastava et al. | |
| 6,527,419 B1 | 3/2003 | Galli | |
| 6,528,755 B2 | 3/2003 | Grewell et al. | |
| 6,530,670 B2 | 3/2003 | Hirayama et al. | |
| 6,549,709 B1 | 4/2003 | De Dobbelaere et al. | |
| 6,551,346 B2 | 4/2003 | Crossley | |
| 6,554,462 B2 | 4/2003 | Hulse et al. | |
| 6,599,000 B2 | 7/2003 | Nolan et al. | |
| 6,608,332 B2 | 8/2003 | Shimizu et al. | |
| 6,614,179 B1 | 9/2003 | Shimizu et al. | |
| 6,621,211 B1 | 9/2003 | Srivastava et al. | |
| 6,635,363 B1 | 10/2003 | Duclos et al. | |
| 6,635,987 B1 | 10/2003 | Wojnarowski et al. | |
| 6,637,924 B2 | 10/2003 | Pelka et al. | |
| 6,671,235 B1 | 12/2003 | Hawryluk et al. | |
| 6,680,004 B2 | 1/2004 | Ono et al. | |
| 6,687,010 B1 | 2/2004 | Horii et al. | |
| 6,694,069 B2 | 2/2004 | Kaneko et al. | |
| 6,709,132 B2 | 3/2004 | Ishibashi | |
| 6,714,711 B1 | 3/2004 | Lieberman et al. | |
| 6,754,408 B2 | 6/2004 | Toda et al. | |
| 6,765,237 B1 | 7/2004 | Doxsee et al. | |
| 6,796,698 B2 | 9/2004 | Sommers et al. | |
| 6,817,735 B2 | 11/2004 | Shimizu et al. | |
| 6,847,170 B2 | 1/2005 | Kayser | |
| 6,850,665 B2 | 2/2005 | Grubsky et al. | |
| 6,853,131 B2 | 2/2005 | Srivastava et al. | |
| 6,871,982 B2 | 3/2005 | Holman et al. | |
| 6,890,234 B2 | 5/2005 | Bortscheller et al. | |
| 6,908,205 B2 | 6/2005 | Greiner et al. | |
| 6,917,057 B2 | 7/2005 | Stokes et al. | |
| 6,939,481 B2 | 9/2005 | Srivastava et al. | |
| 6,941,069 B2 | 9/2005 | Kaneko et al. | |
| 6,943,380 B2 | 9/2005 | Ota et al. | |
| 6,948,829 B2 | 9/2005 | Verdes et al. | |
| 6,965,709 B1 | 11/2005 | Weiss | |
| 6,982,522 B2 | 1/2006 | Omoto et al. | |
| 7,005,086 B2 | 2/2006 | Matsuno et al. | |
| 7,006,306 B2 | 2/2006 | Falicoff et al. | |
| 7,008,078 B2 | 3/2006 | Shimizu et al. | |
| 7,015,510 B2 | 3/2006 | Srivastava et al. | |
| 7,026,756 B2 | 4/2006 | Shimizu et al. | |
| 7,038,246 B2 | 5/2006 | Uemura | |
| 7,045,826 B2 | 5/2006 | Kim et al. | |
| 7,052,152 B2 * | 5/2006 | Harbers et al. | 362/30 |
| 7,066,623 B2 | 6/2006 | Lee et al. | |
| 7,071,616 B2 | 7/2006 | Shimizu et al. | |
| 7,086,767 B2 | 8/2006 | Sidwell et al. | |
| 7,123,796 B2 | 10/2006 | Steckl et al. | |
| 7,144,131 B2 * | 12/2006 | Rains | 362/231 |
| 7,153,008 B2 | 12/2006 | Grote, III et al. | |
| 7,178,941 B2 | 2/2007 | Roberge et al. | |
| 7,193,248 B2 | 3/2007 | Weindorf et al. | |
| 7,204,607 B2 | 4/2007 | Yano et al. | |
| 7,215,086 B2 | 5/2007 | Maxik | |
| 7,218,824 B2 | 5/2007 | Franklin et al. | |
| 7,221,110 B2 | 5/2007 | Sears et al. | |
| 7,230,222 B2 | 6/2007 | Cheng et al. | |
| 7,251,389 B2 | 7/2007 | Lu et al. | |
| 7,259,403 B2 | 8/2007 | Shimizu et al. | |
| 7,267,787 B2 | 9/2007 | Dong et al. | |
| 7,279,832 B2 | 10/2007 | Thurk et al. | |
| 7,288,797 B2 | 10/2007 | Deguchi et al. | |
| 7,293,906 B2 | 11/2007 | Mok et al. | |
| 7,331,700 B2 | 2/2008 | Zhang | |
| 7,345,317 B2 | 3/2008 | Reeh et al. | |
| 7,347,586 B2 | 3/2008 | Izardel | |
| 7,350,936 B2 | 4/2008 | Ducharme et al. | |
| 7,367,692 B2 | 5/2008 | Maxik | |
| 7,375,381 B2 | 5/2008 | Shimizu et al. | |
| 7,382,091 B2 | 6/2008 | Chen et al. | |
| 7,391,060 B2 | 6/2008 | Oshio | |
| 7,396,142 B2 | 7/2008 | Laizure, Jr. et al. | |
| 7,399,108 B2 * | 7/2008 | Ayabe et al. | 362/607 |
| 7,425,798 B2 | 9/2008 | St.-Germain | |
| 7,430,355 B2 | 9/2008 | Heikenfeld et al. | |
| 7,433,565 B2 | 10/2008 | Joseph et al. | |
| 7,465,961 B2 | 12/2008 | Masuda et al. | |
| 7,479,733 B2 | 1/2009 | Chang et al. | |
| 7,481,562 B2 | 1/2009 | Chua et al. | |
| 7,513,669 B2 * | 4/2009 | Chua et al. | 362/606 |
| 7,537,947 B2 | 5/2009 | Smith et al. | |
| 7,540,628 B2 | 6/2009 | Awai et al. | |
| 7,597,470 B2 | 10/2009 | Kurihara et al. | |
| 7,607,815 B2 | 10/2009 | Pang | |
| 7,635,203 B2 | 12/2009 | Weaver, Jr. et al. | |
| 7,638,754 B2 | 12/2009 | Morimoto et al. | |
| 7,639,916 B2 | 12/2009 | Fine | |
| 7,661,841 B2 | 2/2010 | Kurihara et al. | |
| 7,717,589 B2 * | 5/2010 | Nishioka et al. | 362/293 |
| 7,719,022 B2 | 5/2010 | Maeda et al. | |
| 7,722,211 B2 * | 5/2010 | Marra et al. | 362/227 |
| 7,736,042 B2 | 6/2010 | Park, II et al. | |
| 7,736,044 B2 | 6/2010 | Chew et al. | |
| 7,738,054 B2 | 6/2010 | Okumura et al. | |
| 7,791,683 B2 | 9/2010 | Larson et al. | |
| 7,826,698 B1 | 11/2010 | Meir et al. | |
| 7,845,839 B2 | 12/2010 | Collier et al. | |
| 7,891,852 B2 | 2/2011 | Pugh et al. | |
| 7,903,198 B2 | 3/2011 | Abe et al. | |
| 7,991,257 B1 * | 8/2011 | Coleman | 385/129 |
| 8,033,706 B1 | 10/2011 | Kelly et al. | |
| 8,064,743 B2 * | 11/2011 | Meir et al. | 385/31 |
| 2001/0046142 A1 | 11/2001 | Van Santen et al. | |
| 2001/0053072 A1 | 12/2001 | Takemoto | |
| 2002/0118907 A1 | 8/2002 | Sugama et al. | |
| 2002/0122629 A1 | 9/2002 | Grubsky et al. | |
| 2003/0156425 A1 * | 8/2003 | Turnbull et al. | 362/545 |
| 2003/0198455 A1 | 10/2003 | Usami | |
| 2004/0012556 A1 | 1/2004 | Yong et al. | |
| 2004/0156182 A1 | 8/2004 | Hatjasalo et al. | |
| 2004/0196648 A1 | 10/2004 | Franklin et al. | |
| 2004/0246697 A1 | 12/2004 | Yamashita et al. | |
| 2004/0257352 A1 | 12/2004 | Naugler et al. | |
| 2005/0041424 A1 | 2/2005 | Ducharme | |
| 2005/0100288 A1 | 5/2005 | Chu | |
| 2005/0116667 A1 | 6/2005 | Mueller et al. | |
| 2005/0243243 A1 | 11/2005 | Koganezawa | |

| | | |
|---|---|---|
| 2005/0258432 A1 | 11/2005 | Cho |
| 2005/0265403 A1 | 12/2005 | Anderson et al. |
| 2006/0001036 A1 | 1/2006 | Jacob et al. |
| 2006/0001037 A1 | 1/2006 | Schardt et al. |
| 2006/0002146 A1 | 1/2006 | Baba |
| 2006/0008205 A1 | 1/2006 | Meir et al. |
| 2006/0012286 A1 | 1/2006 | Cull et al. |
| 2006/0092346 A1 | 5/2006 | Moon et al. |
| 2006/0098434 A1 | 5/2006 | Liu et al. |
| 2006/0131924 A1 | 6/2006 | Reck |
| 2006/0164840 A1 | 7/2006 | Song et al. |
| 2006/0170332 A1 | 8/2006 | Tamaki et al. |
| 2006/0193133 A1 | 8/2006 | Von Der Brelie |
| 2006/0203502 A1 | 9/2006 | Stevens et al. |
| 2006/0208670 A1 | 9/2006 | Chang et al. |
| 2006/0221610 A1 | 10/2006 | Chew et al. |
| 2006/0227085 A1 | 10/2006 | Boldt et al. |
| 2006/0262250 A1 | 11/2006 | Hobbs |
| 2006/0268537 A1 | 11/2006 | Kurihara et al. |
| 2006/0273337 A1 | 12/2006 | Han et al. |
| 2006/0290253 A1 | 12/2006 | Yeo et al. |
| 2007/0019439 A1 | 1/2007 | Yu et al. |
| 2007/0057626 A1 | 3/2007 | Kurihara et al. |
| 2007/0086211 A1 | 4/2007 | Beeson et al. |
| 2007/0103914 A1 | 5/2007 | McCaffrey |
| 2007/0133210 A1 | 6/2007 | Watson et al. |
| 2007/0133935 A1 | 6/2007 | Fine |
| 2007/0138966 A1 | 6/2007 | Marka et al. |
| 2007/0187710 A1 | 8/2007 | Steen et al. |
| 2007/0188425 A1 | 8/2007 | Saccomanno |
| 2007/0274094 A1 | 11/2007 | Schultz et al. |
| 2007/0284600 A1 | 12/2007 | Shchekin et al. |
| 2007/0297179 A1 | 12/2007 | Leung et al. |
| 2008/0007541 A1 | 1/2008 | Eliasson et al. |
| 2008/0029720 A1 | 2/2008 | Li |
| 2008/0049445 A1 | 2/2008 | Harbers et al. |
| 2008/0055931 A1 | 3/2008 | Verstraete et al. |
| 2008/0061683 A1 | 3/2008 | Bertram |
| 2008/0094348 A1 | 4/2008 | Yin et al. |
| 2008/0122365 A1 | 5/2008 | Decius et al. |
| 2008/0144333 A1 | 6/2008 | Gourlay |
| 2008/0151576 A1 | 6/2008 | Inditsky |
| 2008/0186736 A1 | 8/2008 | Rinko |
| 2008/0192458 A1 | 8/2008 | Li |
| 2008/0205080 A1 | 8/2008 | Erchak et al. |
| 2008/0212315 A1 | 9/2008 | Cornelissen et al. |
| 2008/0218993 A1 | 9/2008 | Li |
| 2008/0239749 A1 | 10/2008 | Saccomanno et al. |
| 2008/0251690 A1 | 10/2008 | Keiper et al. |
| 2008/0252571 A1 | 10/2008 | Hente et al. |
| 2008/0297644 A1 | 12/2008 | Farchtchian et al. |
| 2008/0305439 A1 | 12/2008 | Khan |
| 2008/0316605 A1 | 12/2008 | Hazell et al. |
| 2009/0001397 A1 | 1/2009 | Fine et al. |
| 2009/0002668 A1 | 1/2009 | Rohe et al. |
| 2009/0016060 A1 | 1/2009 | Nakao |
| 2009/0027588 A1 | 1/2009 | Medendorp, Jr. et al. |
| 2009/0046453 A1 | 2/2009 | Kramer |
| 2009/0046978 A1 | 2/2009 | Yasuda et al. |
| 2009/0051268 A1 | 2/2009 | You et al. |
| 2009/0052205 A1 | 2/2009 | Chen et al. |
| 2009/0059553 A1 | 3/2009 | Lin |
| 2009/0067194 A1 | 3/2009 | Sanchez |
| 2009/0116801 A1 | 5/2009 | Fine |
| 2009/0129115 A1 | 5/2009 | Fine et al. |
| 2009/0141476 A1 | 6/2009 | Meir et al. |
| 2009/0151575 A1 | 6/2009 | Eisendrath |
| 2009/0161340 A1 | 6/2009 | Huang et al. |
| 2009/0161341 A1 | 6/2009 | Meir et al. |
| 2009/0161361 A1 | 6/2009 | Meir et al. |
| 2009/0161369 A1 | 6/2009 | Regev et al. |
| 2009/0161383 A1 | 6/2009 | Meir et al. |
| 2009/0162015 A1 | 6/2009 | Meir et al. |
| 2009/0168395 A1 | 7/2009 | Mrakovich et al. |
| 2009/0201955 A1 | 8/2009 | Weigl et al. |
| 2009/0212718 A1 | 8/2009 | Kawashima et al. |
| 2009/0225565 A1 | 9/2009 | Zimmermann et al. |
| 2009/0225566 A1 | 9/2009 | Zimmermann et al. |
| 2009/0236620 A1 | 9/2009 | Park et al. |
| 2009/0250714 A1 | 10/2009 | Yun et al. |
| 2009/0273918 A1 | 11/2009 | Falicoff et al. |
| 2009/0284177 A1 | 11/2009 | Pedersen |
| 2009/0290380 A1 | 11/2009 | Meir et al. |
| 2009/0303412 A1 | 12/2009 | Ake et al. |
| 2009/0310338 A1 | 12/2009 | Negley |
| 2009/0315015 A1 | 12/2009 | Shimizu et al. |
| 2009/0322251 A1 | 12/2009 | Hilgers |
| 2010/0002414 A1 | 1/2010 | Meir et al. |
| 2010/0008628 A1 | 1/2010 | Shani |
| 2010/0014822 A1 | 1/2010 | Fine |
| 2010/0033420 A1 | 2/2010 | Jheng |
| 2010/0045189 A1 | 2/2010 | Storch et al. |
| 2010/0046219 A1 | 2/2010 | Pijlman et al. |
| 2010/0060157 A1 | 3/2010 | Shi |
| 2010/0079841 A1 | 4/2010 | Levola |
| 2010/0098377 A1 | 4/2010 | Meir |
| 2010/0195306 A1 | 8/2010 | Helbing et al. |
| 2010/0201611 A1 | 8/2010 | Duong et al. |
| 2010/0208470 A1 | 8/2010 | Shani et al. |
| 2010/0220484 A1 | 9/2010 | Shani |
| 2010/0315817 A1 | 12/2010 | Zimmermann |
| 2010/0320904 A1 | 12/2010 | Meir |
| 2011/0013415 A1 | 1/2011 | Meir et al. |

FOREIGN PATENT DOCUMENTS

| | | |
|---|---|---|
| DE | 19952430 | 5/2001 |
| EP | 0911658 | 10/1998 |
| EP | 1376708 | 1/2004 |
| EP | 1521503 | 4/2005 |
| EP | 1776722 | 4/2007 |
| EP | 1876385 | 1/2008 |
| EP | 1901587 | 3/2008 |
| EP | 1988752 | 11/2008 |
| EP | 2018089 | 1/2009 |
| GB | 512062 | 8/1939 |
| GB | 2339318 | 1/2000 |
| GB | 2343361 | 5/2000 |
| GB | 2448564 | 10/2008 |
| JP | 5-127158 | 5/1993 |
| JP | 10-247412 | 9/1998 |
| JP | 2004241282 | 8/2004 |
| JP | 2005085718 | 3/2005 |
| WO | WO-96/23649 | 8/1996 |
| WO | WO-97/31219 | 8/1997 |
| WO | WO-99/12400 | 3/1999 |
| WO | WO-01/82657 | 11/2001 |
| WO | WO-02/095289 | 11/2002 |
| WO | WO-03/050448 | 6/2003 |
| WO | WO-03/065201 | 8/2003 |
| WO | WO-2004/017109 | 2/2004 |
| WO | WO-2004/034362 | 4/2004 |
| WO | WO-2004/053531 | 6/2004 |
| WO | WO-2004/100275 | 11/2004 |
| WO | WO-2005/096258 | 10/2005 |
| WO | WO-2005/101070 | 10/2005 |
| WO | WO-2006/131924 A | 12/2006 |
| WO | WO-2007/044472 | 4/2007 |
| WO | WO-2007/055509 | 5/2007 |
| WO | WO-2007/071397 | 6/2007 |
| WO | WO-2007/086657 | 8/2007 |
| WO | WO-2008/013097 | 1/2008 |
| WO | WO-2008/035282 | 3/2008 |
| WO | WO-2008/045311 | 4/2008 |
| WO | WO-2008/053063 | 5/2008 |
| WO | WO-2008/059445 | 5/2008 |
| WO | WO-2008/093267 | 8/2008 |
| WO | WO-2008/100277 | 8/2008 |
| WO | WO-2008/146290 | 12/2008 |
| WO | WO-2008/148927 | 12/2008 |
| WO | WO-2009/130637 | 10/2009 |

OTHER PUBLICATIONS

Application Brief AB27 "For LCD Backlighting Luxeon DCC", Lumileds (2004).
Beeson et al., "61.5: LED-Based Light-Recycling Light Sources for Projection Displays," *SID Symp. Dig. of Tech. Papers*, 37(1): 1823-1826 (2006).

Fine, "Back Light Modular Unit (BLMu) for large LCD screens", SIL (2006).
International Search Report and Written Opinion for PCT/IL08/01553, mailed Mar. 25, 2009.
International Search Report and Written Opinion for PCT/IL2006/000667, dated Jun. 10, 2008.
International Search Report for PCT/IL2003/01042, mailed Jul. 29, 2004.
International Search Report for PCT/IL2008/000730, mailed Nov. 25, 2008.
Jones-Bey, "High-Output LEDs: Solid-state lighting seeks a role in pictures," www.laserfocusworld.com/articles (May 21, 2009).
Smith-Gillespie, R., "LCD Backlighting Options and Design Considerations", SID Display Applications Tutorial (May 22, 2008).
Zwanenburg et al., "41.2; High efficiency LEDs for LCD Backlights," *SID 04 Digest*, p. 1222, ISSN/0004-0966X/04/3502-1222 (2004).

International Search Report and Written Opinion for PCT/IL2008/01554, dated May 19, 2009.
"Solid-State Lighting Research and Development: Multi-year Program Plan," U.S. Department of Energy, 162 pages (Mar. 2010).
ISR and WO for PCT/IL2009/000248, mailed Dec. 14, 2009 (25 pages).
Office Action in Israel Patent Application No. 169122, dated Dec. 22, 2008 (translation).
Tsao et al., "Solid-state lighting: an integrated human factors, technology and economic perspective," Proc. IEEE, pp. 1-18 (Aug. 2009).
International Search Report and Written Opinion for PCT/IB2010/056079 mailed Oct. 11, 2011 (11 pages).

* cited by examiner

ILLUMINATION APPARATUS

RELATED APPLICATIONS

This application is a continuation of U.S. Patent application Ser. No. 11/921,305, filed on Nov. 30, 2007, which is the U.S. national stage application of International (PCT) Patent Application Serial No. PCT/IL2006/000667, filed Jun. 7, 2006, which claims the benefit of U.S. Provisional Patent Application No. 60/687,865, filed Jun. 7, 2005. The entire disclosure of each of these applications is incorporated by reference herein.

FIELD AND BACKGROUND OF THE INVENTION

The present invention relates to artificial illumination and, more particularly, but not exclusively to an illumination apparatus capable of providing light at any intensity profile and any color profile, including, without limitation, uniform white light.

Artificial light can be generated in many ways, including, electroluminescent illumination (e.g., light emitting diodes), incandescent illumination (e.g., conventional incandescent lamps, thermal light sources) and gas discharge illumination (e.g., fluorescent lamps, xenon lamps, hollow cathode lamps). Light can also be emitted via direct chemical radiation discharge of a photoluminescent (e.g., chemoluminescence, fluorescence, phosphorescence).

A light emitting diode (LED) is essentially a p-n junction semiconductor diode that emits a monochromatic light when operated in a forward biased direction. In the diode, current flows easily from the p-side to the n-side but not in the reverse direction. When two complementary charge-carriers (an electron and a "hole") collide, the electron-hole system experiences a transition to a lower energy level and emits a photon. The wavelength of the light emitted depends on the deference between the two energy levels, which in turn depends on the band gap energy of the materials forming the p-n junction.

LEDs are used in various applications, including, traffic signal lamps, large-sized full-color outdoor displays, various lamps for automobiles, solid-state lighting devices, flat panel displays and the like. The basic structure of a LED consists of the light emitting semiconductor material, also known as the bare die, and numerous additional components deigned for improving the performance of the LED. These components include a light reflecting cup mounted below the bare die, a transparent encapsulation, typically silicone, surrounding and protecting the bare die and the light reflecting cup, and bonders, for supplying the electrical current to the bare die. The bare die and the additional components are efficiently packed in a LED package.

Nowadays, the LED has won remarkable attention as a next-generation small-sized light emitting source. The LED has heretofore had advantages such as a small size, high resistance and long life, but has mainly been used as indicator illumination for various measuring meters or a confirmation lamp in a control state because of restrictions on a light emitting efficiency and light emitting output. However, in recent years, the light emitting efficiency has rapidly been improved, and it is said to be a matter of time that the light emitting efficiency exceeds that of a high-pressure mercury lamp or a fluorescent lamp of a discharge type which has heretofore been assumed to have a high efficiency. Due to the appearance of the high-efficiency high-luminance LED, a high-output light emitting source using the LED has rapidly assumed a practicability. In recent years, a blue LED has been brought into a practical use stage in addition to conventional red and green LEDs, and this has also accelerated the application of the LED.

The application of the high-efficiency high-luminance LED has been considered as a promising small-sized light emitting source of an illuminating unit which is requested to have a light condensing capability. The LED originally has characteristics superior to those of another light emitting source, such as life, durability, lighting speed, and lighting driving circuit. Furthermore, above all, blue is added, and three primary colors are all used in a self-light emitting source, and this has enlarged an application range of a full-color image displays.

Luminescence is a phenomenon in which energy is absorbed by a substance, commonly called a luminescent, and emitted in the form of light. The absorbed energy can be in a form of light (photons), electrical field or colliding particles (e.g., electrons). The wavelength of the emitted light differs from the characteristic wavelength of the absorbed energy (the characteristic wavelength equals hc/E, where h is the Plank's constant, c is the speed of light and E is the energy absorbed by the luminescent).

The luminescence is a widely occurring phenomenon which can be classified according to the excitation mechanism as well as according to the emission mechanism. Examples of such classifications include photoluminescence, electroluminescence, fluorescence and phosphorescence. Similarly, luminescent materials are classified into photoluminescents materials, electroluminescent materials, fluorescent materials and phosphorescent materials, respectively.

A photoluminescent is a material which absorbs energy is in the form of light, an electroluminescent is a material which absorbs energy is in the form of electrical field, a fluorescent material is a material which emits light upon return to the base state from a singlet excitation, and a phosphorescent materials is a material which emits light upon return to the base state from a triplet excitation.

In fluorescent materials, or fluorophores, the electron de-excitation occurs almost spontaneously, and the emission ceases when the source which provides the exciting energy to the fluorophore is removed.

In phosphor materials, or phosphors, the excitation state involves a change of spin state which decays only slowly. In phosphorescence, light emitted by an atom or molecule persists after the exciting source is removed.

Luminescent materials are selected according to their absorption and emission characteristics and are widely used in cathode ray tubes, fluorescent lamps, X-ray screens, neutron detectors, particle scintillators, ultraviolet (UV) lamps, flat panel displays and the like.

Luminescent materials, particularly phosphors, are also used for altering the color of LEDs. Since blue light has a short wavelength (compared, e.g., to green or red light), and since the light emitted by the phosphor has a longer wavelength than the absorbed light, blue light generated by a blue LED can be readily converted to produce visible light having a longer wavelength. For example, a blue LED coated by a suitable yellow phosphor can emit white light. The phosphor absorbs the light from the blue LED and emits in a broad spectrum, with a peak in the yellow region. The photons emitted by the phosphor and the non-absorbed photons emitted of the LED are perceived together by the human eye as white light. The first commercially available phosphor based white led was produced by Nichia Co. The white LED consisted of a gallium indium nitride (InGaN) blue LED coated by a yellow phosphor.

In order to get sufficient brightness, a high intensity LED is needed to excite the phosphor to emit the desired color. As commonly known white light is composed of various colors of the whole range of visible electromagnetic spectrum. In the case of LEDs, only the appropriate mixture of complementary monochromatic colors can cast white light. This is achieved by having at least two complementary light sources in the proper power ratio. A "fuller" light (similar to sunlight) can be achieved by adding more colors. Phosphors are usually made of zinc sulfide or yttrium oxides doped with certain transition metals (Ag, Mn, Zn, etc.) or rare earth metals (Ce, Eu, Tb, etc.) to obtain the desired colors.

In a similar mechanism, white LEDs can also be manufactured using fluorescent semiconductor material instead of a phosphor. The fluorescent semiconductor material serves as a secondary emitting layer, which absorbs the light created by the light emitting semiconductor and reemits yellow light. The fluorescent semiconductor material, typically an aluminum gallium indium phosphide (AlGaInP), is bonded to the primary source wafer.

Another type of light emitting device is an organic light emitting diode (OLED) which makes use of thin organic films. An OLED device typically includes an anode layer, a cathode layer, and an organic light emitting layer containing an organic compound that provides luminescence when an electric field is applied. OLED devices are generally (but not always) intended to emit light through at least one of the electrodes, and may include one or more transparent electrodes.

Combination of LEDs, OLEDs and luminescence is widely used in the field of electronic display devices.

Many efforts have been made to research and develop various electronic display devices. Electronic display devices may be categorized into active display devices and passive display devices. The active display devices include the cathode ray tube (CRT), the plasma display panel (PDP) and the electroluminescent display (ELD). The passive display devices include liquid crystal display (LCD), the electrochemical display (ECD) and the electrophoretic image display (EPID).

In active display devices, each pixel radiates light independently. Passive display devices, on the other hand, do not produce light within the pixel and the pixel is only able to block light. In LCD devices, for example, an electric field is applied to liquid crystal molecules, and an alignment of the liquid crystal molecule is changed depending on the electric field, to thereby change optical properties of the liquid crystal, such as double refraction, optical rotatory power, dichroism, light scattering, etc. Since LCD are passive, they display images by reflecting external light transmitted through an LCD panel or by using the light emitted from a light source, e.g., a backlight assembly, disposed below the LCD panel.

An LCD includes a LCD panel and backlight assembly. The LCD panel includes an arrangement of pixels, which are typically formed of thin film transistors fabricated on a transparent substrate coated by a liquid crystal film. The pixels include three color filters, which transmit one third of the light produced by each pixel. Thus, each LCD pixels is composed of three sub-pixels. The thin film transistors are addressed by gate lines to perform display operation by way of the signals applied thereto through display signal lines. The signals charge the liquid crystal film in the vicinity of the respective thin film transistors to effect a local change in optical properties of the liquid crystal film.

Typical backlight assembly of LCD includes an array of white LEDs for emitting white light, a light guiding plate for guiding the light toward the LCD panel, a reflector, disposed under the light guiding plate to reflect the lights leaked from the light guiding plate toward the light guiding plate, and optical sheets for enhancing brightness of the light exited from the light guiding plate. Backlight assembly are designed to achieve many goals, including high brightness, large area coverage, uniform luminance throughout the illuminated area, controlled viewing angle, small thickness, low weight, low power consumption and low cost.

In operation, the backlight assembly produces white illumination directed toward the LCD pixels. The optical properties of the liquid crystal film are locally modulated by the thin film transistors to create a light intensity modulation across the area of the display. The color filters colorize the intensity-modulated light emitted by the pixels to produce a color output. By selective opacity modulation of neighboring pixels of the three color components, selected intensities of the three component colors are blended together to selectively control color light output. Selective the blending of three primary colors such as red, green, and blue (RGB) can generally produce a full range of colors suitable for color display purposes.

LCD devices are currently employed in many applications (cellular phones, personal acceptance devices, desktop monitors, portable computers, television displays, etc.), and there is a growing attention to devise backlight high-quality assemblies for improving the image quality inn these applications.

Since the back light must pass through the color filters it therefore must include the wavelength at which the respective filter is transparent. However, the use of white LED composed of a blue LED coated by a yellow phosphor, is not efficient for backlighting because, although such dichromatic light appears as white light for the human eye, it cannot efficiently pass through the RGB color filters. Another approach is to use red green and blue LEDs which match the central wavelength of each color filter. This approach significantly complicates the manufacturing process because the red, green and blue LEDs have to be accurately aligned in a multichip approach. An additional approach is to generate white light using a UV LED and three different phosphors each emitting light at a different wavelength (red, green and blue). The efficiency of this configuration, however, is very low because high amount of heat is released due to the Stokes shift. Other configurations include, two LEDs and a phosphor (e.g., a blue LED a red LED and a green phosphor), three LEDs and a phosphor (e.g., a blue LED, a red LED, a cyan LED and a green phosphor), two LEDs and two phosphors (e.g., a blue LED, a red LED, a cyan phosphor and a green phosphor), and the like. Although these configurations show improvement in the performances, the results are far from being optimal.

Presently known LED based backlight devices are limited by the size, price and performance of the LEDs. To date, the performance of the LED are controlled by its transparent encapsulation which provides the necessary light scatter, the phosphor or fluorescent semiconductor material which is responsible for color conversion, and the lead frame which allows for heat evacuation, all of which significantly increase the size and cost of the LED. Since the performance, cost and size of the LED are conflicting features, some compromises are inevitable.

There is thus a widely recognized need for, and it would be highly advantageous to have a diode-based illumination apparatus, devoid of the above limitations.

SUMMARY OF THE INVENTION

The background art does not teach or suggest illumination apparatus capable of generating light while, at the same time, propagating, diffusing and emitting the light through its surface area or a portion thereof. The background art also does not teach or suggest such illumination apparatus having superior optical and/or geometrical properties, including, without limitation, a thickness of a few centimeters or less, and high light quality in terms of brightness, intensity and/or color profiles. The background art also does not teach such illumination apparatus that is useful for a variety of different applications, e.g., passive displays, which can benefit from its superior properties.

The present embodiments overcome these deficiencies of the background art by providing an illumination apparatus, which generates and diffuses light. The illumination apparatus comprises one or more light emitting sources embedded in a waveguide material. The waveguide material is capable of propagating light generated by the light emitting source(s), such that at least a portion of the light is diffused within the waveguide material and exits through at least a portion of its surface. In various exemplary embodiments of the invention the light emitting source(s) comprise bare dies.

The apparatus of the present embodiments can be incorporated in a passive display device or it can serve for providing signage or for providing illumination at various decorative patterns of significant aesthetic interest. In various exemplary embodiments of the invention the apparatus serves as a component in a liquid crystal display device.

According to another aspect of the present invention there is provided a method of providing illumination, comprising applying forward bias on one or more light emitting sources embedded in a waveguide material to effect emission of light from the light emitting source(s). The waveguide material is capable of propagating the light such that at least a portion of the light is diffused within the waveguide material and exits through at least a portion of its surface, thereby providing the illumination.

According to yet another aspect of the present invention there is provided a liquid crystal display device, comprising a liquid crystal panel and a backlight unit, which preferably comprises the illumination apparatus described herein.

The present embodiments further comprise a portable computer system comprising the liquid crystal display device, a computer monitor comprising the liquid crystal display device, a personal digital assistant system comprising the liquid crystal display device, a cellular communication system comprising the liquid crystal display device, and a television system comprising the liquid crystal display device.

The present embodiments further comprise a signage panel for producing a signage under electronic control. The signage panel comprises a power source connected to the illumination apparatus described herein.

According to further features in preferred embodiments of the invention described below, the waveguide material is flexible.

According to still further features in the described preferred embodiments the light emitting source(s) comprises at least one bare die and electrical contacts connected thereto.

According to still further features in the described preferred embodiments the light emitting source(s) is encapsulated by a transparent thermal isolating encapsulation.

According to still further features in the described preferred embodiments the light emitting source(s) is embedded near the second surface of the waveguide material.

According to still further features in the described preferred embodiments the light emitting source(s) is embedded near the second surface in a manner such that electrical contacts of the light emitting source(s) remain outside the waveguide material at the second surface.

According to still further features in the described preferred embodiments the illumination apparatus further comprises a printed circuit board electrically connected to the electrical contacts.

According to still further features in the described preferred embodiments the printed circuit board is capable of evacuating heat away from the light emitting source(s).

According to still further features in the described preferred embodiments the light emitting source(s) is embedded in the bulk of the waveguide material.

According to still further features in the described preferred embodiments the illumination apparatus further comprises an arrangement of electrical lines extending from the light emitting source(s) to at least one end of the waveguide material.

According to still further features in the described preferred embodiments the light emitting source(s) comprises at least one source configured to emit light at a first color, and at least one source configured to emit light at a second color.

According to still further features in the described preferred embodiments the liquid crystal panel comprises an arrangement of color filters operating at a plurality of distinct colors, and the light emitting source(s) comprises, for each color of the plurality of distinct colors, at least one source configured to emit light at the color.

According to still further features in the described preferred embodiments the illumination apparatus further comprises a reflecting surface embedded in or attached to the waveguide material in a manner such that emission of light through the second surface is prevented and emission of light through the first surface is enhanced.

According to still further features in the described preferred embodiments the illumination apparatus further comprises at least one photoluminescent layer coating at least the portion of the first surface.

According to still further features in the described preferred embodiments the at least one photoluminescent layer and the light emitting source(s) are selected such the illumination apparatus provides substantially white light.

According to still further features in the described preferred embodiments the liquid crystal panel comprises an arrangement of color filters operating at a plurality of distinct colors, wherein the at least one photoluminescent layer and the light emitting source(s) are selected such the illumination apparatus provides light at least at the a plurality of distinct colors.

According to still further features in the described preferred embodiments the at least one photoluminescent layer comprises a plurality of photoluminescent layers, each being characterized by a different absorption spectrum, and the light emitting source(s) comprises, for each absorption spectrum, at least one light emitting source characterized by an emission spectrum overlapping the absorption spectrum.

According to still further features in the described preferred embodiments the illumination apparatus further comprises a structured film deposited on or embedded in the waveguide material.

According to still further features in the described preferred embodiments the illumination apparatus further comprises at least one optical element embedded in the waveguide material for enhancing diffusion of light within the waveguide material.

According to still further features in the described preferred embodiments the at least one optical element is embedded in the waveguide material near the first surface and configured to reflect light striking the at least one optical element at a predetermined range of angles, and transmit light striking the at least one optical element at other angles.

According to still further features in the described preferred embodiments the at least one optical element comprises at least one microlens.

According to still further features in the described preferred embodiments the waveguide material comprises a polymeric material.

According to still further features in the described preferred embodiments the waveguide material comprises a rubbery material.

According to still further features in the described preferred embodiments the waveguide material is formed by dip-molding in a dipping medium.

According to still further features in the described preferred embodiments the dipping medium comprises a hydrocarbon solvent in which a rubbery material is dissolved or dispersed.

According to still further features in the described preferred embodiments the dipping medium comprises additives selected from the group consisting of cure accelerators, sensitizers, activators, emulsifying agents, cross-linking agents, plasticizers, antioxidants and reinforcing agents According to still further features in the described preferred embodiments the waveguide material comprises a dielectric material, and wherein a reflection coefficient of the dielectric material is selected so as to allow propagation of polarized light through the waveguide material and emission of the polarized light through the first surface.

According to still further features in the described preferred embodiments the waveguide material comprises a metallic material, and wherein a reflection coefficient of the metallic material is selected so as to allow propagation of polarized light through the waveguide material and emission of the polarized light through the first surface.

According to still further features in the described preferred embodiments the waveguide material is a multilayered material.

According to still further features in the described preferred embodiments the waveguide material comprises a first layer having a first refractive index, and a second layer being in contact with the first layer and having a second refractive index being larger that the first refractive index.

According to still further features in the described preferred embodiments the second layer comprises polyisoprene.

According to still further features in the described preferred embodiments the first layer comprises silicone.

According to still further features in the described preferred embodiments the waveguide material further comprises a third layer being in contact with the second layer and having a third refractive index being smaller than the second refractive index.

According to still further features in the described preferred embodiments the third refractive index equals the first refractive index.

According to still further features in the described preferred embodiments at least one layer of waveguide material comprises at least one additional component designed and configured such as to allow the emission of the light through the at least a portion of the surface.

According to still further features in the described preferred embodiments the at least one additional component is capable of producing different optical responses to different spectra of the light.

According to still further features in the described preferred embodiments the different optical responses comprise different emission angles.

According to still further features in the described preferred embodiments the different optical responses comprise different emission spectra.

According to still further features in the described preferred embodiments the at least one additional component comprises at least one impurity capable of emitting at least the portion of the light through the first surface.

According to still further features in the described preferred embodiments the at least one impurity comprises a plurality of particles capable of scattering the light.

According to still further features in the described preferred embodiments a size of the plurality of particles is selected so as to selectively scatter a predetermined spectrum of the light.

The present invention successfully addresses the shortcomings of the presently known configurations by providing an illumination apparatus and various uses thereof.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
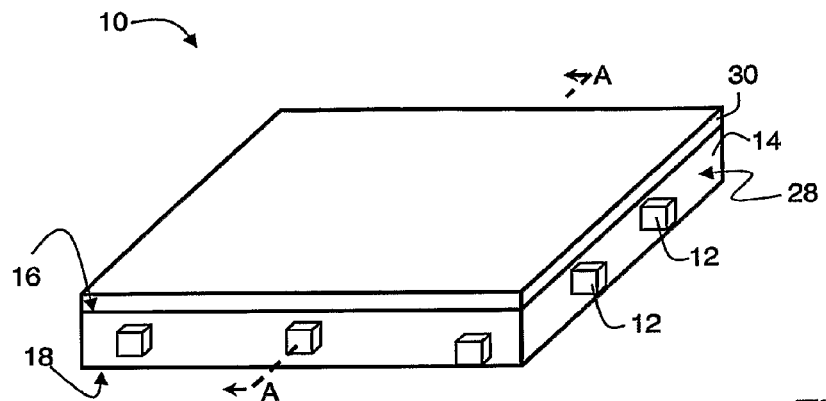
FIGS. 1a-b are schematic illustrations of a perspective view (FIG. 1a) and a section view (FIG. 1b) of an illumination apparatus, according to various exemplary embodiments of the present invention.

The present embodiments comprise an apparatus, device and system which can be used for providing illumination or displaying images. Specifically, the embodiments can be used to provide light at any intensity profile and any color profile. The present embodiments are useful in many areas in which illumination is required, including, without limitation, display, signage and decoration applications.

The principles and operation of an apparatus, device and system according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

When a ray of light moves within a transparent substrate and strikes one of its internal surfaces at a certain angle, the ray of light can be either reflected from the surface or refracted out of the surface into the open air in contact with the substrate. The condition according to which the light is reflected or refracted is determined by Snell's law, which is a mathematical relation between the impinging angle, the refracting angle (in case in case of refraction) and the refractive indices of both the substrate and the air. Broadly speaking, depending on the wavelength of the light, for a sufficiently large impinging angle (also known as the critical angle) no refraction can occur and the energy of the light is trapped within the substrate. In other words, the to light is reflected from the internal surface as if from a mirror. Under these conditions, total internal reflection is said to take place.

Many optical systems operate according to the total internal reflection phenomenon. One such optical system is the optical fiber. Optical fibers are transparent flexible rods of glass or plastic, basically composed of a core and cladding. The core is the inner part of the fiber, through which light is guided, while the cladding surrounds it completely. The refractive index of the core is higher than that of the cladding, so that light in the core impinging the boundary with the cladding at a critical angle is confined in the core by total internal reflection.

As stated, total internal reflection occurs only for light rays impinging the internal surface of the optical fiber with an angle which is larger than the critical angle. Thus, a calculation performed according to geometrical optics may provide the largest angle which is allowed for total internal reflection to take place. An important parameter of every optical fiber (or any other light transmitting optical system) is known as the "numerical aperture," which is defined as the sine of the largest incident light ray angle that is successfully transmitted through the optical fiber, multiplied by the index of refraction of the medium from which the light ray enters the optical fiber.

Another optical system designed for guiding light is the graded-index optical fiber, in which the light ray is guided by refraction rather than by total internal reflection. In this optical fiber, the refractive index decreases gradually from the center outwards along the radial direction, and finally drops to the same value as the cladding at the edge of the core. As the refractive index does not change abruptly at the boundary between the core and the cladding, there is no total internal reflection. However, although no total internal reflection takes place, the refraction bends the guided light rays back into the center of the core while the light passes through layers with lower refractive indexes.

Optical fibers are available in various lengths and core-diameters. For large core diameters, glass optical fibers are known to be more brittle and fragile than plastic optical fiber.

Another type of optical system is based on photonic materials, where the light ray is confined within a band gap material surrounding the light ray. In this type of optical system, also known as a photonic material waveguide, the light is confined in the vicinity of low-index region. One example of a photonic material waveguide is a silica fiber having an array of small air holes throughout its length. This configuration is capable of providing lossless light transmitting, e.g., in either cylindrical or planar type waveguides.

The above description holds both for polarized and unpolarized light. When polarized light is used, an additional electromagnetic phenomenon influences the reflection of the light, as further explained hereinbelow.

Polarized light is produced when the direction of the electromagnetic fields in the plane perpendicular to the direction of propagation are constrained in some fashion. For the purpose of providing a simple explanation, only the electric field is discussed herein. A complementary explanation, regarding the magnetic field, can be easily obtained by one ordinarily skilled in the art by considering the magnetic field as being perpendicular to both the direction of propagation and the electric field.

The light is said to be elliptically polarized when two perpendicular components of the electric field have a constant phase difference, and the tip of the electric field vector traces out an ellipse in the plane perpendicular to the direction of propagation. Linearly polarized light is a special case of elliptically polarized light, where the two components oscillate in phase and the electric vector traces out a straight line.

Circularly polarized light is also a special case of elliptically polarized light in which the two components have a 90° phase difference and the electric field vector traces out a circle in the plane perpendicular to the direction of propagation. When viewed looking towards the source, a right circularly polarized beam at a fixed position as a function of time has a field vector that describes a clockwise circle, while left circularly polarized light has a field vector that describes a counter-clockwise circle.

When a polarized light strike a surface between two different materials, it is useful to define the polarization of the light relative to the surface, typically horizontal and vertical polarizations, with respect to the surface. When the light strikes a material having associated values of permeability, permittivity and conductivity, a portion of the energy carried by the light is lost due non-ideal conductivity of the material. The relative portion of the energy which is lost is defined as the reflection coefficient of the material. The reflective coefficient varies according to the angle of incidence, the polarization of the incoming wave, its frequency and the characteristics of the surface. For horizontal polarizations the coefficient may be generalized to a constant value, whereas for vertical polarizations however, the coefficient varies between 0 and 1.

When the reflective coefficient value goes to zero, the light is not reflected from the surface. This phenomenon is known as the Brewster effect, and the angle at which there is no reflection (for a particular polarization) is called the Brewster angle. This angle often referred to as the polarizing angle, since an unpolarized wave incident on an interface at this angle is reflected as a polarized wave with its electric vector being perpendicular to the plane of incidence.

The present embodiments successfully provide illumination apparatus which provides surface illumination at any brightness, intensity and color profile. As further detailed hereinunder, there is an additional physical phenomenon which may be exploited by the illumination apparatus of the present embodiments. This phenomenon is known as light scattering.

Unlike the above mention reflection, where radiation is deflected from the surface in one direction, some particles and molecules, also known as scatterers, have the ability to scatter radiation in more than one direction. Many types of scatterers are known. Broadly speaking, scatterers may be categorized into two groups: (i) selective scatterers, which are more effective at scattering a particular wavelength (i.e., color), or a narrow range of wavelengths, of the light; and (ii) non-selective scatterers are capable of scattering light in a wide range of wavelengths.

Figure 1B:
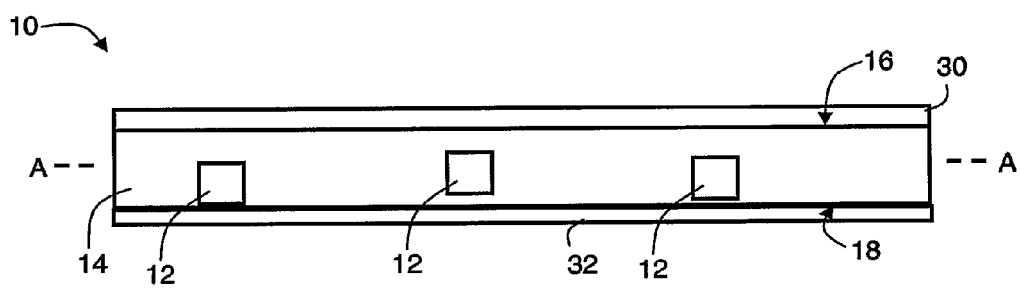

Referring now to the drawings, FIGS. 1a-b illustrate a perspective view (FIG. 1a) and a section view along line A-A (FIG. 1b) of an illumination apparatus 10, according to various exemplary embodiments of the present invention.

Apparatus 10 comprises one or more light emitting sources 12 embedded in a waveguide material 14 having a first surface 16 and a second surface 18. Waveguide material 14 is capable of propagating light generated by light source 12, such that at least a portion of the light is diffused within waveguide material 14 and exits through at least a portion of first surface 16.

The terms "light source" or "light emitting source", are used herein to interchangeably and refer to any self light emitting element, including, without limitation, an inorganic light emitting diode, an organic light emitting diode or any other electroluminescent element. The term "light source" as used herein refers to one or more light sources.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

Organic light emitting diodes suitable for the present embodiments can be bottom emitting OLEDs, top emitting OLEDs and side emitting OLEDs, having one or two transparent electrodes.

As used herein, "top" refers to furthest away from surface 18, while "bottom" refers to closest to surface 18.

The waveguide material according to embodiments of the present invention may be similar to, and/or be based on, the teachings of U.S. patent application Ser. Nos. 11/157,190, 60/580,705 and 60/687,865, all assigned to the common assignee of the present invention and fully incorporated herein by reference. Alternatively, the waveguide material according to some embodiments of the present invention may also have other configurations and/or other methods of operation as further detailed hereinunder.

Waveguide material 14 can be translucent or clear as desired. In any event, since waveguide material 14 propagates and emits the light emitted by light source 12, it is transparent at least to the characteristic emission spectrum of light source 12. The characteristic emission spectrum of the light source is also referred to herein as "the color" of the light source. Thus, for example, a light emitting source characterized by a spectrum having an apex at a wavelength of from about 420 to about 500 nm, is referred to as a "blue light source", a light emitting source characterized by a spectrum having an apex at a wavelength of from about 520 to about 580 nm, is referred to as a "green light source", a light emitting source characterized by a spectrum having an apex at a wavelength of about 620-680 nm, is referred to as a "red light source", and so on for other colors. This terminology is well-known to those skilled in the art of optics.

As used herein the term "about" refers to ±10%.

Figure 1C:
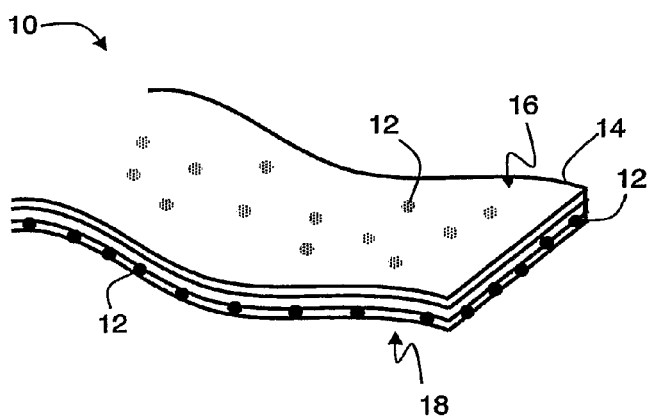
FIG. 1c is a schematic illustration of a perspective view of the apparatus in a preferred embodiment in which the apparatus comprises a non-planar waveguide material.

Waveguide material 14 is optionally and preferably flexible, and may also have a certain degree of elasticity. Thus, material 14 can be, for example, an elastomer. It is to be understood that although waveguide material appears to be flat in FIGS. 1a-b, this need not necessarily be the case since for some applications it may not be necessary for the illumination apparatus to be flat. FIG. 1c schematically illustrates a perspective view of apparatus 10 in a preferred embodiment in which waveguide material 14 is non-planar. Further, although apparatus 10 is shown as opaque from one direction, this is only for the clarity of presentation and need not necessarily be the case; the surfaces of apparatus 10 are not necessarily opaque.

According to a preferred embodiment of the present invention apparatus 10 comprises a reflecting surface 32 which prevents emission of light through surface 18 and therefore enhances emission of light through surface 16. Surface 32 can be made of any light reflecting material, and can be either embedded in or attached to waveguide material 14. Apparatus 10 can further comprise a printed circuit board (not shown, see reference numeral 26 in FIG. 2b) which supplies the forward bias to the embedded light source.

There are several advantages for embedding the light source within the waveguide material. One advantage is that all the light emitted from the light source eventually arrives at the waveguide material. When the light source is externally coupled to the waveguide material, some of the light scatters at wide angle and does not impinge the waveguide material. Thus, the embedding of light source 12 in waveguide material 14 allows to efficiently collect the emitted light.

Another advantage is the optical coupling between the light source and the waveguide material in particular when the light source is a light emitting diode. When the diode is externally coupled to the waveguide material, the light emitted from the p-n junction should be transmitted out of the diode into the air, and subsequently from the air into the waveguide material. The mismatch of impedances in each such transition significantly reduces the coupling efficiency due to unavoidable reflections when the light passes from one medium to the other. On the other hand, when the diode is embedded in waveguide material, there is a direct transition of light from the diode to the waveguide material with higher overall transmission coefficient. To further improve the coupling efficiency, the waveguide material is preferably selected with a refraction index which is close to the refraction index of the diode. Typical difference in refraction indices is from about 1.5 to about 1.6.

Light source 12 can be a LED, which includes the bare die and all the additional components packed in the LED package, or, more preferably, light source 12 can include the bare die, excluding one or more of the other components (e.g., reflecting cup, silicon, LED package and the like).

As used herein "bare die" refers to a p-n junction of a semiconductor material. When a forward biased is applied to the p-n junction through electrical contacts connected to the p side and the n side of the p-n junction, the p-n junction emits light at a characteristic spectrum.

Thus, in various exemplary embodiments of the invention light source 12 includes only the semiconductor p-n junction and the electrical contacts. Also contemplated are configurations in which several light sources are LEDs, and several light sources other are bare dies with electrical contacts connected thereto.

The advantage of using a bare die rather than a LED is that some of the components in the LED package including the LED package absorb part of the light emitted from the p-n junction and therefore reduce the light yield.

Another advantage is that the use of bare die reduces the amount of heat generated during light emission. This is because heat is generated due to absorption of light by the LED package and reflecting cup. The consequent increase in temperature of the p-n junction causes thermal imbalance which is known to reduce the light yield. Since the bare die does not include the LED package and reflecting cup, the embedding of a bare die in the waveguide material reduces the overall amount of heat and increases the light yield. The elimination of the LED package permits the use of many small bare dies instead of each large packaged LED. Such configuration allows operating each bare die in low power while still producing sufficient overall amount of light, thereby to improving the p-n junction efficacy.

An additional advantage is light diffusion within the waveguide material. The minimization of redundant components in the vicinity of the p-n junction results in almost isotropic emission of light from the p-n junction which improves the diffusion of light. To further improve the coupling efficiency, the waveguide material is preferably selected with a refraction index which is close to the refraction index of the p-n junction.

Figure 2A:
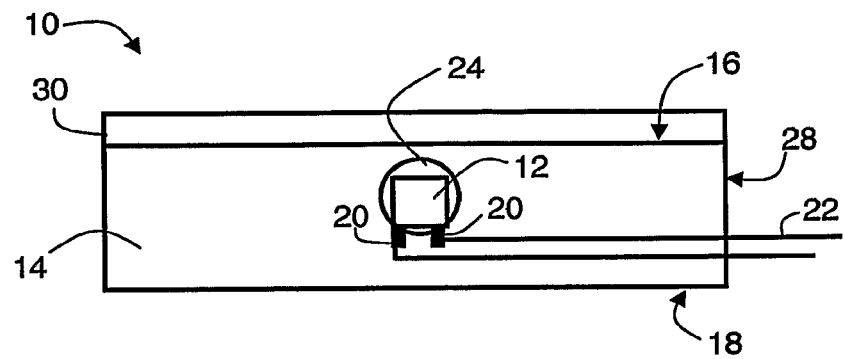
FIGS. 2a-b are schematic fragmentary views of the apparatus in a preferred embodiment in which a source or sources embedded in the bulk of the waveguide material (FIG. 1a), and in another preferred embodiment in which the source or sources are embedded near the surface of the waveguide material (FIG. 1b)
Figure 2B:
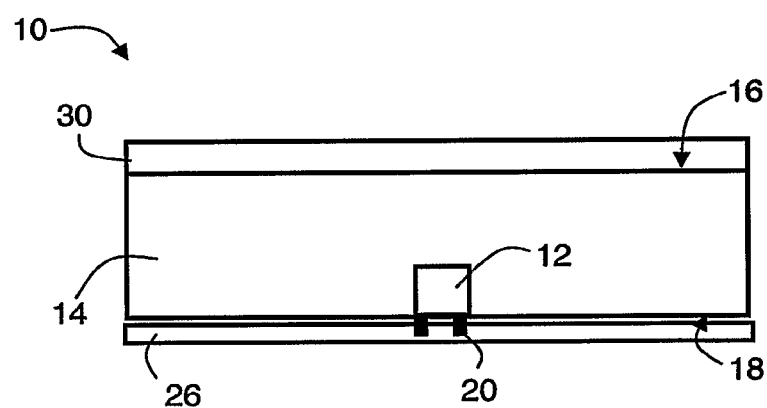

Light source 12 can be embedded in the bulk of waveguide material 14 or near surface 18. FIG. 2a is a fragmentary view schematically illustrating the embodiment in which light source 12 is embedded in the bulk of material 14 and FIG. 2b is fragmentary view schematically illustrating the embodiment in which light source 12 is embedded near surface 18. It is to be understood that FIGS. 2a-b illustrate a single light source 12 for clarity of presentation and it is not intended to limit the scope of the present invention to such configuration. As stated, apparatus 10 can comprise one or more light emitting sources.

Referring to FIG. 2a, when light source 12 is embedded in the bulk of the waveguide material, the electrical contacts 20 remain with material 14. In this embodiment, the forward bias can be supplied to light source 12 by electrical lines 22, such as flexible conductive wires, which are also embedded in material 14. Thus, lines 22 extend from contacts 20 to one or more ends 28 of waveguide material 14. Light source 12 including the electrical lines 22 can be embedded in material 14 during the manufacturing process of the waveguide material. When a plurality of light sources are embedded in the waveguide material, they can be connected to an arrangement of electrical lines as known in the art and the entire of light sources and arrangement of electrical lines can be embedded in the material during the manufacturing process of the waveguide material.

In various exemplary embodiments of the invention light source 12 is operated with low power and therefore does not produce large amount of heat. This is due to the relatively large light yield of the embedded light source and the high optical coupling efficiency between the light source and the waveguide material. In particular, when light source 12 is a bare die, its light yield is significantly high while the produced heat is relatively low. Light source 12 can also be operated using pulsed electrical current which further reduces the amount of produced heat.

Preferably, but not obligatorily, light source 12 is encapsulated by a transparent thermal isolating encapsulation 24. Encapsulation 24 serves for thermally isolating the light source from material 14. This embodiment is particularly useful when light source 12 is a bare die, in which case the bare die radiate heat which may change the optical properties of material 14. Alternatively or additionally, waveguide material 14 can be made with high specific heat capacity to allow material 14 to receive heat from light source 12 with minimal or no undesired heating effects.

Referring to FIG. 2b, when light source 12 is embedded near surface 18 of material 14, electrical contacts 20 can remain outside material 14 at surface 18 and can therefore be accessed without embedding electrical lines in material 14. The electrical contacts can be applied with forward bias using external electrical lines or directly from a printed circuit board 26. In this embodiment, board 26 can be made, at least in part, of heat conducting material so as to facilitate evacuation of heat away from light source 12. When the heat evacuation by board 26 is sufficient, light source 12 can be embedded without thermal isolating encapsulation 24.

As stated, waveguide material 14 is capable of propagating and diffusing the light until it exits though surface 16 or a portion thereof. It will be appreciated that this ability of the waveguide material, combined with the high light yield and efficient optical coupling between the embedded light sources and the waveguide material, provide apparatus 10 with properties suitable for many applications.

As is further detailed hereinunder, there are many alternatives to construct the waveguide material, which provide flexibility in its design. In particular the waveguide material can be tailored according to the desired optical properties of the waveguide. Thus, the distribution of light sources within the waveguide material and/or the optical properties of the waveguide material can be selected to provide the most suitable illumination for the specific application for which apparatus 10 is used. More specifically apparatus 10 can provide illumination at a predetermined light profile, which is manifested by a predetermined intensity profile, predetermined brightness profile and predetermined color profile. Such illumination apparatus can therefore provide high light quality in terms of brightness, intensity and/or color profiles.

For example, light sources emitting different colors of light (i.e., light sources having different characteristic emission spectra, which may or may not have spectral overlaps therebetween), say two, three or more different colors, can be distributed in the waveguide such that surface 16 emits light at a predetermined light profile. Additionally, the optical properties of the waveguide material can be made local and wavelength-dependent according to the predetermined light profile. More specifically, according to the presently preferred embodiment of the invention, different regions in the waveguide material have a different response to different light spectra.

In various exemplary embodiments of the invention apparatus 10 comprises one or more photoluminescent layers 30 coating surface 16 or a portion thereof. Photo luminescent layer 30 comprises a photoluminescent material which can be a phosphor or a fluorophore.

The term "photoluminescent layer" is commonly used herein to describe one photoluminescent layer or a plurality of photoluminescent layers. Additionally, a photoluminescent layer can comprise one or more types of photoluminescent molecules. In any event, a photoluminescent layer is characterized by an absorption spectrum (i.e., a range of wavelengths of light which can be absorbed by the photoluminescent molecules to effect quantum transition to a higher energy level) and an emission spectrum a range of wavelengths of light which are emitted by the photoluminescent molecules as a result of quantum transition to a lower energy level). The emission spectrum of the photoluminescent layer is typically wider and shifted relative to its absorption spectrum. The difference in wavelength between the apex of the absorption and emission spectra of the photoluminescent layer is referred to as the Stokes shift of the photoluminescent layer.

The absorption spectrum of photoluminescent layer 30 preferably overlaps the emission spectrum of at least one of light sources 12. More preferably, for each characteristic emission spectrum of an embedded light source, there is at least one photoluminescent layer having an absorption spectrum overlapping the emission spectrum the light source. According to a preferred embodiment of the present invention the apex of the light source's emission spectrum lies in the spectrum of the photoluminescent layer, and/or the apex of the photoluminescent layer's absorption spectrum lies in the spectrum of the light source.

Photoluminescent layer 30 serves for "converting" the wavelength of a portion of the light emitted by light sources 12. More specifically, for each photon which is successfully absorbed by layer 30, a new photon is emitted. Depending on the type of photoluminescent, the emitted photon can have a wavelength which is longer or shorter than the wavelength of the absorbed photon. Photons which do not interact with layer 30 propagate therethrough. The combination of converted light and non-converted light forms the light profile of apparatus 10.

Phosphors are widely used for coating individual LEDs, typically in the white LEDs industry. However, photoluminescent layers covering an illuminating surface of a waveguide material such as the waveguide material of the present embodiments have not been employed. The advantage of using layer 30 over waveguide material 14, as opposed to on each individual light emitting source 12, is that waveguide material 14 first diffuses the light and thereafter emits it through surface 16. Thus, instead of collecting light from a point light source (e.g., a LED), layer 30 collects light from a surface light source having a predetermined area (surface 16 or a portion thereof). This configuration allows a better control on the light profile provided by apparatus 10.

Many types of phosphorescent and fluorescent substance are contemplated. Representative examples include, without limitation the phosphors disclosed in U.S. Pat. Nos. 5,813,752, 5,813,753, 5,847,507, 5,959,316, 6,155,699, 6,351,069, 6,501,100, 6,501,102, 6,522,065, 6,614,179, 6,621,211, 6,635,363, 6,635,987, 6,680,004, 6,765,237, 6,853,131, 6,890,234, 6,917,057, 6,939,481, 6,982,522, 7,015,510, 7,026,756 and 7,045,826 and 7,005,086.

The various possible light profile options make the apparatus of the present embodiments suitable for providing illumination in many applications. Representative examples of uses of apparatus 10, including, without limitation, architectural highlighting, decorative lighting, medical lighting, signage for displaying commercial or decorative expressions, visual guidance (e.g., landing strips, aisles), display, exhibit lighting, roadway lighting, automotive lighting and the like. The flexibility of the waveguide material makes apparatus 10 attachable to many surfaces, including, without limitation, walls of a building (either external or internal), windows, boxes (e.g., jewelry boxes), toys and the like.

Although apparatus 10 can be designed to provide any light profile, for many applications it is desired to construct apparatus 10 to provide substantially uniform illumination. The apparatus of the present embodiments can provide illumination characterized by a uniformity of at least 70%, more preferably at least 80%, even more preferably at least 90%. This is particularly useful when apparatus 10 is incorporated in a backlight unit of a passive display device.

Whit light illumination can be provided in more than one way. In one embodiment, the waveguide material is embedded with red light sources, green light sources, blue light sources and optionally light sources of other colors (e.g., orange, yellow, green-yellow, cyan, amber, blue-violet) which are distributed such that the combination of red light, green light, blue light and optionally light in the other colors appears as a substantially uniform white light across the area of surface 16 or a portion thereof.

In another embodiment, layer 30 serves for complementing the light emitted by light sources 12 to a white light, e.g., using dichromatic, trichromatic, tetrachromatic or multichromatic approach.

For example, a blue-yellow dichromatic approach can be employed, in which case blue light sources (e.g., bare dies of InGaN with a peak emission wavelength at about 460 nm), can be distributed in waveguide material 14, and layer 30 can be made of phosphor molecules with absorption spectrum in the blue range and emission spectrum extending to the yellow range (e.g., cerium activated yttrium aluminum garnet, or strontium silicate europium). Since the scattering angle of light sharply depends on the frequency of the light (fourth power dependence for Rayleigh scattering, or second power dependence for Mie scattering), the blue light generated by the blue light sources is efficiently diffused in the waveguide material and exits, substantially uniformly, through surface 16 into layer 30. Layer 30 which has no preferred directionality, emits light in its emission spectrum and complements the blue light which is not absorbed to white light.

In another dichromatic configurations, ultraviolet light sources (e.g., bare dies of GaN, AlGaN and/or InGaN with a peak emission wavelength between 360 nm and 420 nm), can be distributed in waveguide material 14. Light of such ultraviolet light sources is efficiently diffused in the waveguide material and exits, substantially uniformly, through surface 16. To provide substantially white light, two photoluminescent layers are preferably deposited on surface 16. One layer can be characterized by an absorption spectrum in the ultraviolet range and emission spectrum in the orange range (with peak emission wavelength from about 570 nm to about 620 nm), and another layer characterized by an absorption spectrum in the ultraviolet range and emission spectrum in the blue-green range (with peak emission wavelength from about 480 nm to about 500 nm). The orange light and blue-green light emitted by the two photoluminescent layers blend to appear as white light to a human observer. Since the light emitted by the ultraviolet light sources is above or close to the end of visual range it is not seen by the human observer. The two photoluminescent layers are preferably deposited one on top of the other such as to improve the uniformity. Alternatively, a single layer having two types of photoluminescent with the above emission spectra can be deposited.

In another embodiment a trichromatic approach is employed. For example, blue light sources can be distributed in the waveguide material as described above, with two photoluminescent layers deposited on surface 16. A first photoluminescent layer can be made of phosphor molecules with absorption spectrum in the blue range and emission spectrum extending to the yellow range as described above, and a second photoluminescent layer absorption spectrum in the blue range and emission spectrum extending to the red range (e.g., cerium activated yttrium aluminum garnet doped with a trivalent ion of praseodymium, or europium activated strontium sulphide). The unabsorbed blue light, the yellow light and the red light blend to appear as white light to a human observer.

Also contemplated is a configuration is which light sources with different emission spectra are distributed and several photoluminescent layers are deposited, such that the absorption spectrum of each photoluminescent layer overlaps one of the emission spectra of the light sources, and all the emitted colors (of the light sources and the photoluminescent layers) blend to appear as white light. The advantage of such multichromatic configuration is that it provides high quality white balance because it allows better control on the various spectral components of the light in a local manner across the surface of the illumination apparatus.

The color composite of the white output light depends on the intensities and spectral distributions of the emanating light emissions. These depend on the spectral characteristics and spatial distribution of the light sources, and, in the embodiments in which one or more photoluminescent layers are employed, on the spectral characteristics of the photoluminescent layer(s) and the amount of unabsorbed light. The amount of light that is unabsorbed by the photoluminescent layer(s) is in turn a function of the thickness of the photoluminescent layer(s), the density of photoluminescent material(s) and the like. By judiciously selecting the emission spectra of light emitting source 12 and optionally the thickness, density, and spectral characteristics (absorption and emission spectra) of layer 30, apparatus 10 can be made to serve as an illumination surface (either planar or non planar, either stiff of flexible) which provides substantially uniform white light.

In any of the above embodiments, the "whiteness" of the light can be tailored according to the specific application for which apparatus 10 is used. For example, when apparatus 10 is incorporated for backlight of an LCD device, the spectral components of the light provided by apparatus 10 can be selected in accordance with the spectral characteristics of the color filters of the liquid crystal panel. In other words, since a typical liquid crystal panel comprises an arrangement of color filters operating at a plurality of distinct colors, the white light provided by apparatus 10 includes at least at the distinct colors of the filters. This configuration significantly improves the optical efficiency as well is the image quality provided by the LCD device, because the optical losses due to mismatch between the spectral components of the backlight unit and the color filters of the liquid crystal panel are reduced or eliminated.

Thus, in the embodiment in which the white light is achieved by light sources emitting different colors of light (e.g., red light, green light and blue light), the emission spectra of the light sources are preferably selected to substantially overlap the characteristic spectra of the color filters of the LCD panel. In the embodiment in which apparatus 10 is supplemented by one or more photoluminescent layers the emission spectra of the photoluminescent layers and optionally the emission spectrum or spectra of the light sources are preferably selected to overlap the characteristic spectra of the color filters of the LCD panel. Typically the overlap between a characteristic emission spectrum and a characteristic filter spectrum is about 70% spectral overlap, more preferably about 80% spectral overlap, even more preferably about 90%.

Figure 3:
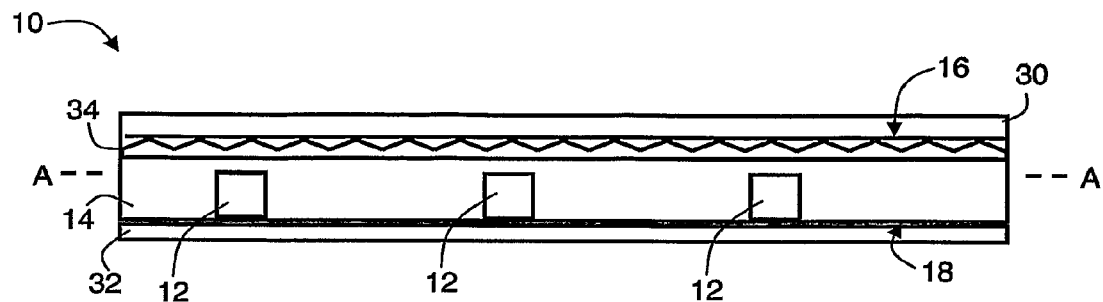
FIG. 3 is a schematic illustration of a section view of the apparatus, in a preferred embodiment in which the apparatus comprises a structured film.

Reference is now made to FIG. 3 which is a section view along line A-A of FIG. 1a, according to a preferred embodiment in which apparatus 10 comprises a structured film 34. Structured film 34 can be, for example, a brightness enhancement film and it can be deposited on or embedded in waveguide material 14. Film 34 collimates the light emitted from light sources 12 thereby increasing the brightness of the illumination provided by apparatus 10. This embodiment is particularly useful when apparatus 10 is used for backlight of an LCD device. The increased brightness enables a sharper image to be produced by the liquid crystal panel and allows operating the light sources at low power to produce a selected brightness. The structured film can operate according to principles and operation of prisms. Thus, light rays arriving the structured film at small angles relative to the normal to the structured film are reflected, while other light rays are refracted. The reflected light rays continue to propagate and diffuse in the waveguide material until they arrive at the structured film at a sufficiently large angle. In the embodiment in which apparatus 10 comprises the reflecting surface 32 it prevents the light which is reflected from film 34 to exit through surface 18. Structured films are known in the art and are found in the literature, see, e.g., International Patent Application Publication No. WO 96/023649.

Figure 4:
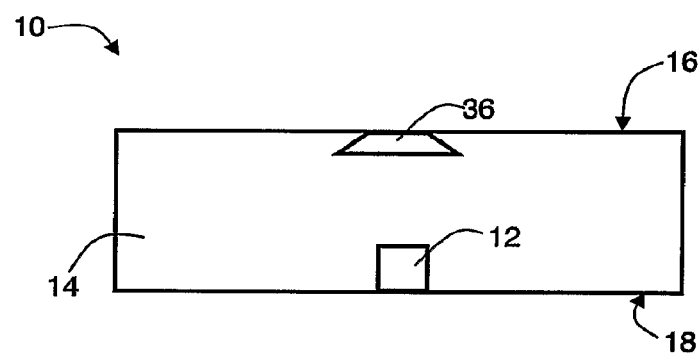
FIG. 4 is a schematic illustration of a fragmentary view of the apparatus in a preferred embodiment in which the apparatus comprises one or more embedded optical elements for enhancing the diffusion of light.

Reference is now made to FIG. 4 which is a fragmentary view schematically illustrating an embodiment in which apparatus 10 comprises one or more optical elements 36 embedded waveguide material 14 for enhancing the diffusion of light. One skilled in the art will recognize that several components of apparatus 10 have been omitted from FIG. 4 for clarity of presentation. Element 36 can be embedded in material 14 near surface 16 or at any other location. The embedding of element near surface 16 is more and In various exemplary embodiments of the invention element 36 operates as an angle-selective light transmissive element. Specifically, element 36 is preferably configured to reflect light striking element 36 at a predetermined range of angles (say, ±10° from the normal to surface 16), and transmit light striking element 36 at other angles. Element 36 can be a mini prism, a structured surface similar to surface 34 above, a microlens and the like. Element 36 can be embedded in material 14 during the manufacturing process of material 14 in parallel to the embedding of light source 12 or any other component. The size of element 36 is selected to allow the collection of light rays at the predetermined range of angles and therefore depends on the distance between surface 16 and light source 12. Thus, in the embodiments in which light source 12 is embedded near surface 18, element 36 has larger size compared to its size in the embodiments in which light source 12 is embedded in the bulk of material 14.

Figure 5:
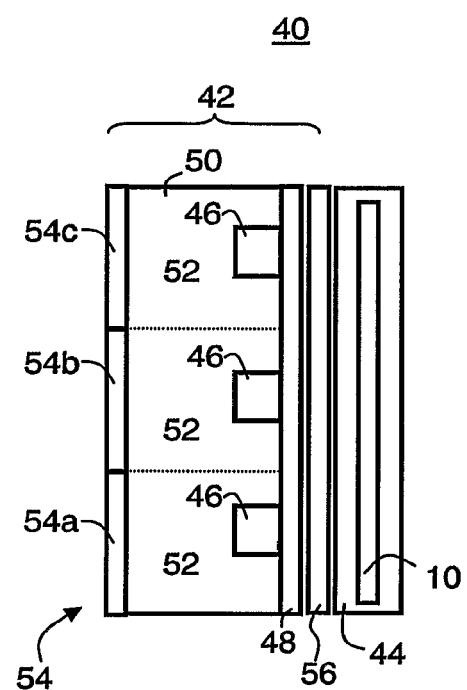
FIG. 5 is a block diagram schematically illustrating a liquid crystal display device, according to various exemplary embodiments of the present invention.

Reference is now made to FIG. 5 which is a block diagram schematically illustrating a liquid crystal display device 40, according to various exemplary embodiments of the present invention. Device 40 comprises a liquid crystal panel 42 and a backlight unit 44. Backlight unit 44 can be or it can comprise comprises illumination apparatus 10 as further detailed hereinabove. Several components of apparatus 10 have been omitted from FIG. 5 for clarity of presentation, but one of ordinary skill in the art, provided with the details described herein would know how to construct apparatus 10 according to the various exemplary embodiments described above.

Panel 42 comprises a matrix of thin film transistors 46 fabricated on a substrate 48 of glass or another transparent material. A liquid crystal film 50 is disposed over substrate 48 and transistors 46. A polarizer 56 is disposed on a backside of substrate 48. Transistors 16 can be addressed by gate lines (not shown) deposited on the substrate 48 during the fabrication of transistors 16 as is well known in the art. Each particular transistor applied by voltage conducts electrical current and charges film 50 in its vicinity. The charging of the liquid crystal film alters the opacity of the film, and effects a local change in light transmission of the liquid crystal film 20. Hence, transistors 16 define display cells 52 (e.g., pixels) in liquid crystal film 50. Typically, the opacity of each display cells is charged to one of several discrete opacity levels to implement an intensity gray scale. Thus, the display cells serves as a gray scale picture elements. However, pixel opacity also can be controlled in a continuous analog fashion or a digital (on/off) fashion.

Color-selective filters 54 are distributed on cells 52 across the display area of panel 42 to produce a color display. Typically, but not obligatorily, there are three types of color filters (designated in FIG. 5 by 54a, 54b and 54c) where each filter allows transmission of one of the three primary additive colors red, green and blue. The schematic block diagram of FIG. 5 illustrates a single three-component cell which includes a first component color (e.g., red output by cell 52 covered by filter 54a), a second component color (e.g., green output by cell 52 covered by filter 54b), and a third component color (e.g., blue output by the cell 52 covered by the filter 54c) that are selectively combined or blended to generate a selected color.

In operation, backlight unit 44 produces a substantially uniform white illumination as detailed above, and polarizer 56 optimizes the light polarization with respect to polarization properties of liquid crystal film 20. The opacity of the cells 52 is modulated using transistors 46 as detailed above to create a transmitted light intensity modulation across the area of device 40. Color filters 54 colorize the intensity-modulated light emitted by the pixels to produce a color output. By selective opacity modulation of neighboring display cells 52 of the three color components, selected intensities of the three colors are blended together to selectively control color light output. As is known in the art, selective blending of three primary colors such as red, green, and blue can generally produce a full range of colors suitable for color display purposes. Spatial dithering is optionally and preferably used to provide further color blending across neighboring color pixels Display device 40 can be incorporated in may applications. Representative examples include, without limitation, a portable computer system (e.g., a laptop), a computer monitor, a personal digital assistant system, a cellular communication system (e.g., a mobile telephone), a portable navigation system, a television system and the like.

Additional objects, advantages and features of the present embodiments will become apparent to one ordinarily skilled in the art upon examination of the following examples for constructing waveguide material 14, which are not intended to be limiting. According to a preferred embodiment of the present invention waveguide material 14 comprises a polymeric material. The polymeric material may optionally comprise a rubbery or rubber-like material. According to a preferred embodiment of the present invention material 14 is formed by dip-molding in a dipping medium, for example, a hydrocarbon solvent in which a rubbery material is dissolved or dispersed. The polymeric material optionally and preferably has a predetermined level of cross-linking, which is preferably between particular limits. The cross-linking may optionally be physical cross-linking, chemical cross-linking, or a combination thereof. A non-limiting illustrative example of a chemically cross-linked polymer comprises cross-linked polyisoprene rubber. A non-limiting illustrative example of a physically cross-linked polymer comprises cross-linked comprises block co-polymers or segmented co-polymers, which may be cross-linked due to micro-phase separation for example. Material 14 is optionally cross-linked through application of a radiation, such as, but not limited to, electron beam radiation and electromagnetic radiation.

Although not limited to rubber itself, the material optionally and preferably has the physical characteristics of rubber, such as parameters relating to tensile strength and elasticity, which are well known in the art. For example, material 14 is preferably characterized by a tensile set value which is below 5%. The tensile set value generally depends on the degree of cross-linking and is a measure of the ability of flexible material 14, after having been stretched either by inflation or by an externally applied force, to return to its original dimensions upon deflation or removal of the applied force.

The tensile set value can be determined, for example, by placing two reference marks on a strip of material 14 and noting the distance between them along the strip, stretching the strip to a certain degree, for example, by increasing its elongation to 90% of its expected ultimate elongation, holding the stretch for a certain period of time, e.g., one minute, then releasing the strip and allowing it to return to its relaxed length, and re-measuring the distance between the two reference marks. The tensile set value is then determined by comparing the measurements before and after the stretch, subtracting one from the other, and dividing the difference by the measurement taken before the stretch. In a preferred embodiment, using a stretch of 90% of its expected ultimate elongation and a holding time of one minute, the preferred tensile set value is less than 5%. Also contemplated are materials having about 30% plastic elongation and less then 5% elastic elongation.

The propagation and diffusion of light through material 14 can be done in any way known in the art, such as, but not limited to, total internal reflection, graded refractive index and band gap optics. Additionally, polarized light may be used, in which case the propagation of the light can be facilitated by virtue of the reflective coefficient of material 14. For example, a portion of material 14 can be made of a dielectric material having a sufficient reflective coefficient, so as to trap the light within at least a predetermined region.

In any event, material 14 is preferably designed and constructed such that at least a portion of the light propagates therethrough at a plurality of directions, so as to allow the diffusion of the light in material 14 and the emission of the light through more than one point in surface 16.

Figure 6A:
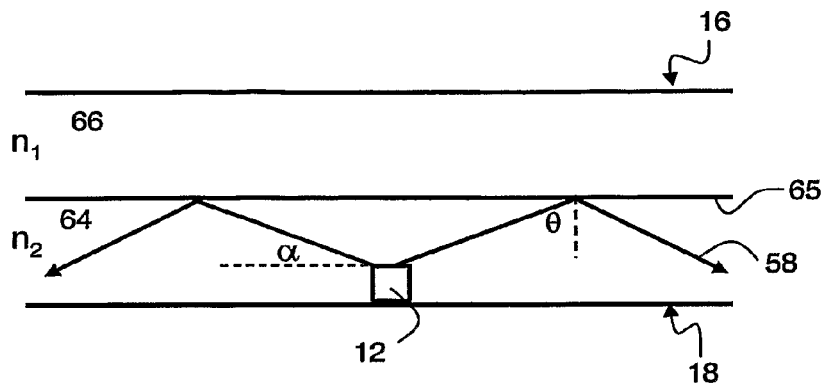
FIG. 6a is a schematic illustration of the waveguide material in a preferred embodiment in which two layers are employed.
Figure 6B:
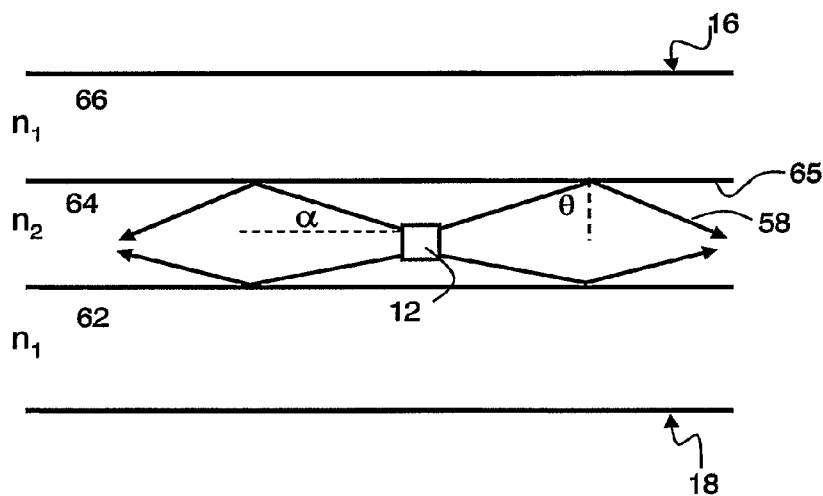
FIGS. 6b-c are schematic illustrations of the waveguide material in preferred embodiments in which three layers are employed.
Figure 6C:
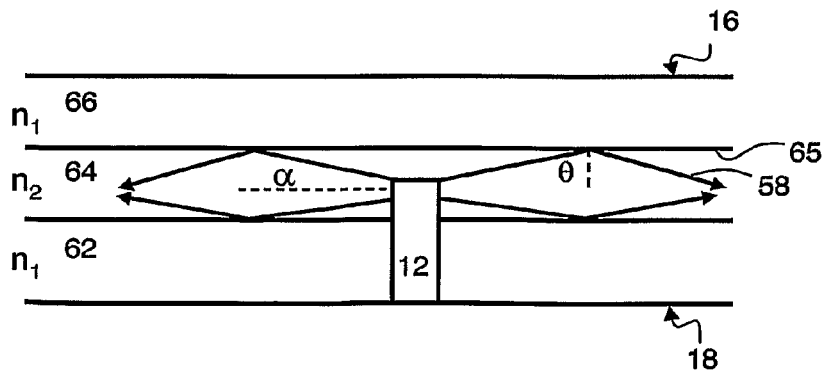

Reference is now made to FIGS. 6a-b, which illustrates material 14 in an embodiment in which total internal reflection is employed. In this embodiment material 14 comprises a first layer 62 and a second layer 64. Preferably, the refractive index of layer 66, designated in FIGS. 6a-b by $n_1$, is smaller than the refractive index, $n_2$, of layer 64. In such configuration, when the light, shown generally at 58, impinges on internal surface 65 of layer 64 at an impinging angle, $\theta$, which is larger than the critical angle, $\theta_c \equiv \sin^{-1}(n_1/n_2)$, the light energy is trapped within layer 64, and the light propagates therethrough in a predetermined propagation angle, $\alpha$. FIGS. 6b-c, schematically illustrate embodiments in which material 14 has three layers, 62, 64 and 66, where layer 64 is interposed between layer 62 and layer 66. In this embodiment, the refractive index of layers 62 and 64 is smaller than the refractive index of layer 64. As shown, light source 12 can be embedded in layer 64 (see FIG. 6b) or it can be embedded in a manner such that it extends over two layers (e.g., layers 62 and 64 see FIG. 6c).

The light may also propagate through waveguide material 14 when the impinging angle is smaller than the critical angle, in which case one portion of the light is emitted and the other portion thereof continue to propagate. This is the case when material 14 comprises dielectric or metallic materials, where the reflective coefficient depends on the impinging angle, $\theta$.

The propagation angle, $\alpha$, is approximately $\pm(\pi/2-\theta)$, in radians. $\alpha$ depends on the ratio between the indices of refraction of the layers. Specifically, when $n_2$ is much larger than $n_1$, $\alpha$ is large, whereas when the ratio $n_2/n_1$ is close to, but above, unity, $\alpha$ is small. According to a preferred embodiment of the present invention the thickness of the layers of material 14 and the indices of refraction are selected such that the light propagates in a predetermined propagation angle. A typical thickness of each layer is from about 10 μm to about 3 mm, more preferably from about 50 μm to about 500 μm, most preferably from about 100 μm to about 200 μm. The overall thickness of material 14 depends on the height of light source 12. For example, when light source 12 is a LED device of size 0.6 mm (including the LED package), the height of material 14 is preferably from about 0.65 mm to about 0.8 mm. When light source 12 is a bare die of size 0.1 mm, the height of material 14 is preferably from about 0.15 mm to about 0.2 mm.

The difference between the indices of refraction of the layers is preferably selected in accordance with the desired propagation angle of the light. According to a preferred embodiment of the present invention, the indices of refraction are selected such that propagation angle is from about 2 degrees to about 15 degrees. For example, layer 64 may be made of poly(cis-isoprene), having a refractive index of about 1.52, and layers 62 and 66 may be made of Poly(dimethyl siloxane) having a refractive index of about 1.45, so that $\Delta n \equiv n_2 - n_1 \approx 0.07$ and $n_2/n_1 \approx 0.953$ corresponding to a propagation angle of about ±19 degrees.

The emission of the light from surface 16 of material 14 may be achieved in more than one way. Broadly speaking, one or more of the layers of waveguide material 14 preferably comprises at least one additional component 71 (not shown, see FIGS. 7a-d) designed and configured so as to allow the emission of the light through the surface. Following are several examples for the implementation of component 71, which are not intended to be limiting.

Figure 7A:
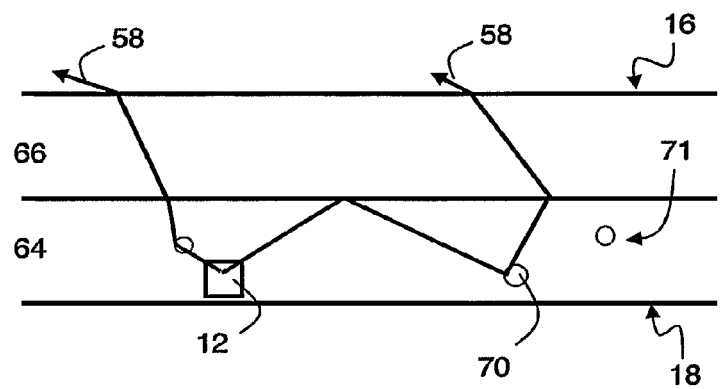
FIG. 7a is a schematic illustration of the waveguide material in a preferred embodiment in which at least one impurity is used for scattering light.

Referring to FIG. 7a, in one embodiment, component 71 is implemented as at least one impurity 70, present in second layer 64 and capable of emitting light, so as to change the propagation angle of the light. Impurity 70 may serve as a scatterer, which, as stated, can scatter radiation in more than one direction. When the light is scattered by impurity 70 in such a direction that the impinging angle, $\theta$, which is below the aforementioned critical angle, $\theta_c$, no total internal reflection occurs and the scattered light is emitted through surface 16. According to a preferred embodiment of the present invention the concentration and distribution of impurity 70 is selected such that the scattered light is emitted from a predetermined region of surface 16. More specifically, in regions of waveguide material 14 where larger portion of the propagated light is to be emitted through the surface, the concentration of impurity 70 is preferably large, while in regions where a small portion of the light is to be emitted the concentration of impurity 70 is preferably smaller.

As will be appreciated by one ordinarily skilled in the art, the energy trapped in waveguide material 14 decreases each time a light ray is emitted through surface 16. On the other hand, it is often desired to use material 14 to provide a uniform surface illumination. Thus, as the overall amount of energy decreases with each emission, a uniform surface illumination can be achieved by gradually increasing the ratio between the emitted light and the propagated light. According to a preferred embodiment of the present invention, the increasing emitted/propagated ratio is achieved by an appropriate selection of the distribution of impurity 70 in layer 64. More specifically, the concentration of impurity 70 is preferably an increasing function of the optical distance which the propagated light travels.

Optionally, impurity 70 may comprise any object that scatters light and which is incorporated into the material, including but not limited to, beads, air bubbles, glass beads or other ceramic particles, rubber particles, silica particles and so forth, any of which may optionally be fluorescent particles or biological particles, such as, but not limited to, Lipids.

Figure 7B:
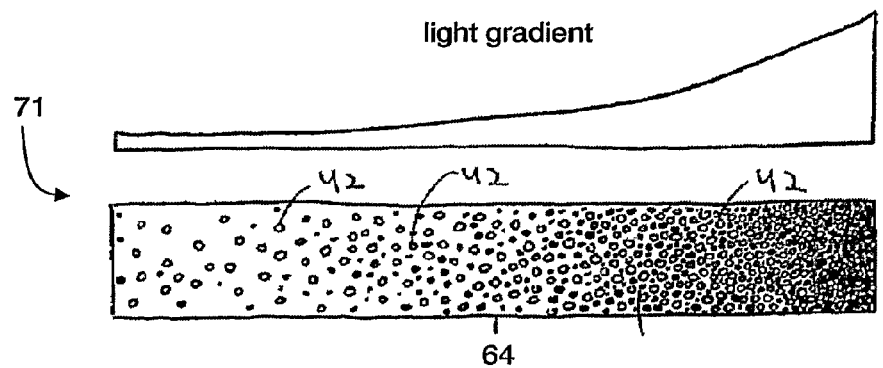
FIG. 7b is a schematic illustration of the waveguide material in a preferred embodiment in which the impurity comprises a plurality of particles having a gradually increasing concentration.

FIG. 7b further details the presently preferred embodiment of the invention. In FIG. 7b, impurity 70 is optionally and preferably implemented as a plurality of particles 42, distributed in an increasing concentration so as to provide a light gradient. Particles 42 are preferably organized so as to cause light to be transmitted with substantially lowered losses through scattering of the light. Particles 42 may optionally be implemented as a plurality of bubbles in a solid plastic portion, such as a tube for example. According to a preferred embodiment of the present invention the size of particles 42 is selected so as to selectively scatter a predetermined range of wavelengths of the light. More specifically small particles scatter small wavelengths and large particles scatter both small and large wavelengths.

Particles 42 may also optionally act as filters, for example for filtering out particular wavelengths of light. Preferably, different types of particles 42 are used at different locations in waveguide material 14. For example, particles 42 which are specific to scattering of a particular spectrum may preferably be used within waveguide material 14, at locations where such particular wavelength is to be emitted from waveguide material 14 to provide illumination.

According to a preferred embodiment of the present invention impurity 70 is capable of producing different optical responses to different wavelengths of the light. The difference optical responses can be realized as different emission angles, different emission wavelengths and the like. For example, different emission wavelengths may be achieved by implementing impurity 70 as beads each having predetermined combination of color-components, e.g., a predetermined combination of fluorophore molecules.

When a fluorophore molecule embedded in a bead absorbs light, electrons are boosted to a higher energy shell of an unstable excited state. During the lifetime of excited state (typically 1-10 nanoseconds) the fluorochrome molecule undergoes conformational changes and is also subject to a multitude of possible interactions with its molecular environment. The energy of excited state is partially dissipated, yielding a relaxed singlet excited state from which the excited electrons fall back to their stable ground state, emitting light of a specific wavelength. The emission spectrum is shifted towards a longer wavelength than its absorption spectrum. The difference in wavelength between the apex of the absorption and emission spectra of a fluorochrome (also referred to as the Stokes shift), is typically small.

Thus, in this embodiment, the wavelength (color) of the emitted light is controlled by the type(s) of fluorophore molecules embedded in the beads. Other objects having similar or other light emission properties may be also be used. Representative examples include, without limitation, fluorochromes, chromogenes, quantum dots, nanocrystals, nanoprisms, nanobarcodes, scattering metallic objects, resonance light scattering objects and solid prisms.

Figure 7C:
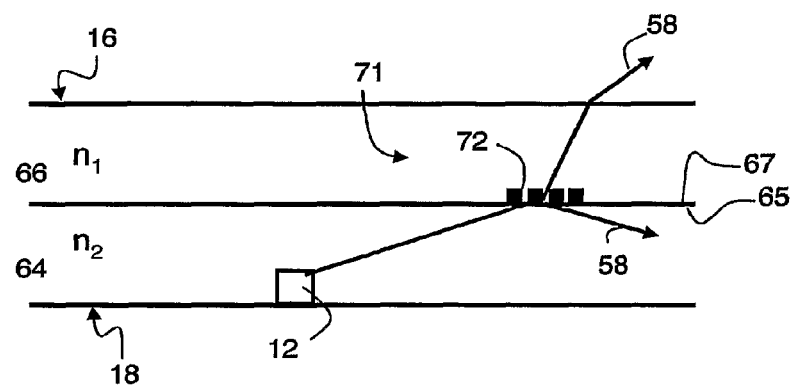
FIG. 7c is a schematic illustration of the waveguide material in a preferred embodiment in which one layer thereof is formed with one or more diffractive optical elements for at least partially diffracting the light.

Referring to FIG. 7c, in another embodiment, component 71 is implemented as one or more diffractive optical elements 72 formed with layer 64, for at least partially diffracting the light. Thus, the propagated light reaches optical element 72 where a portion of the light energy is coupled out of material 14, while the remnant energy is redirected through an angle, which causes it to continue its propagation through layer 64. Optical element 70 may be realized in many ways, including, without limitation, non-smooth surfaces of layer 64, a miniprism or grating formed on internal surface 65 and/or external surface 67 of layer 64. Diffraction Gratings are known to allow both redirection and transmission of light. The angle of redirection is determined by an appropriate choice of the period of the diffraction grating often called "the grating function." Furthermore, the diffraction efficiency controls the energy fraction that is transmitted at each strike of light on the grating. Hence, the diffraction efficiency may be predetermined so as to achieve an output having predefined light intensities; in particular, the diffraction efficiency may vary locally for providing substantially uniform light intensities. Optical element 70 may also be selected such that the scattered light has a predetermined wavelength. For example, in the embodiment in which optical element 70 is a diffraction grating, the grating function may be selected to allow diffraction of a predetermined range of wavelengths.

Figure 7D:
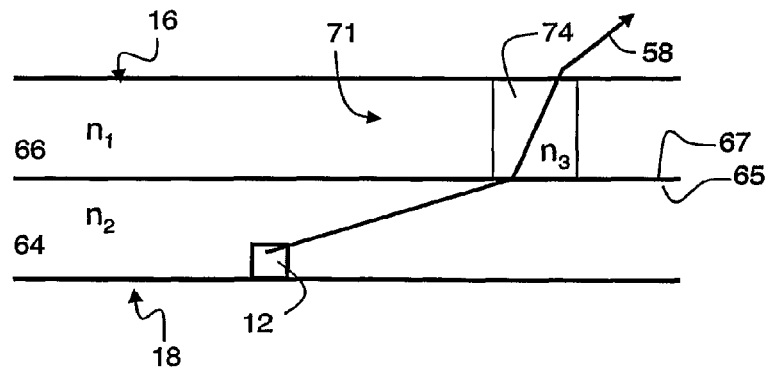
FIG. 7d is a schematic illustration of the waveguide material in a preferred embodiment in which one or more regions have different indices of refraction so as to prevent the light from being reflected.

Referring to FIG. 7d, in an additional embodiment, one or more regions 74 of layer 62 and/or 66 may have different indices of refraction so as to prevent the light from being reflected from internal surface 65 of second layer 64. For example, denoting the index of refraction of region 74 by $n_3$, a skilled artisan would appreciate that when $n_3 > n_2$, no total internal reflection can take place, because the critical angle, $\theta_c$, is only defined when the ratio $n_3/n_2$ does not exceed the value of 1. The advantage of this embodiment is that the emission of the light through surface 16 is independent on the wavelength of the light.

As stated, flexible material 14 preferably comprises polymeric material. The polymeric material may optionally comprise natural rubber, a synthetic rubber or a combination thereof. Examples of synthetic rubbers, particularly those which are suitable for medical articles and devices, are taught in U.S. Pat. No. 6,329,444, hereby incorporated by reference as if fully set forth herein with regard to such illustrative, non-limiting examples. The synthetic rubber in this patent is prepared from cis-1,4-polyisoprene, although of course other synthetic rubbers could optionally be used. Natural rubber may optionally be obtained from *Hevena brasiliensis* or any other suitable species.

Other exemplary materials, which may optionally be used alone or in combination with each other, or with one or more of the above rubber materials, include but are not limited to, crosslinked polymers such as: polyolefins, including but not limited to, polyisoprene, polybutadiene, ethylene-propylene copolymers, chlorinated olefins such as polychloroprene (neoprene) block copolymers, including diblock-, triblock-, multiblock- or star-block-, such as: styrene-butadiene-styrene copolymers, or styrene-isoprene-styrene copolymers (preferably with styrene content from about 1% to about 37%), segmented copolymers such as polyurethanes, polyether-urethanes, segmented polyether copolymers, silicone polymers, including copolymers, and fluorinated polymers and copolymers.

For example, optionally and preferably, the second layer comprises polyisoprene, while the first layer optionally and preferably comprises silicone. If a third layer is present, it also optionally and preferably comprises silicone.

According to an optional embodiment of the present invention, the flexible material is formed by dip-molding in a dipping medium. Optionally, the dipping medium comprises a hydrocarbon solvent in which a rubbery material is dissolved or dispersed. Also optionally, the dipping medium may comprise one or more additives selected from the group consisting of cure accelerators, sensitizers, activators, emulsifying agents, cross-linking agents, plasticizers, antioxidants and reinforcing agents.

It is expected that during the life of this patent many relevant wave guiding techniques will be developed and the scope of the term waveguide material is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:
1. An illumination apparatus comprising:
a substantially planar waveguide;
at least one light source embedded within the waveguide, wherein the waveguide (i) retains therein substantially all light emitted by the at least one embedded light source, and (ii) causes the light to propagate and diffuse within the waveguide until the light is caused to exit from an exit region of a surface thereof;

disposed over the exit region of the waveguide, at least one photoluminescent material for converting a wavelength of a portion of the light emitted by the at least one light source; and a reflective material proximate a bottom surface of the waveguide.

2. The illumination apparatus of claim 1, wherein unconverted light from the at least one light source mixes with light converted by the at least one photoluminescent material to produce substantially white light.

3. The illumination apparatus of claim 1, wherein each said at least one light source is a bare die LED.

4. The illumination apparatus of claim 1, wherein each said at least one light source is a packaged LED.

5. The illumination apparatus of claim 1, wherein each said at least one light source is an organic LED.

6. The illumination apparatus of claim 1, further comprising an optical element for redirecting at least a portion of the light emitted by the at least one light source out of the exit region.

7. The illumination apparatus of claim 6, wherein the optical element comprises at least one of a plurality of impurities, one or more prisms, one or more gratings, one or more microlenses, or a non-smooth surface.

8. The illumination apparatus of claim 6, wherein the optical element is spaced away from the at least one light source toward the exit region.

9. The illumination apparatus of claim 1, wherein the exit region comprises a portion of a top surface of the waveguide displaced from the at least one light source.

10. The illumination apparatus of claim 1, wherein the at least one light source is embedded proximate the bottom surface of the waveguide.

11. The illumination apparatus of claim 1, wherein the at least one photoluminescent material is disposed only over the exit region of the waveguide.

12. The illumination apparatus of claim 1, further comprising an encapsulation material disposed between the at least one light source and the waveguide.

\* \* \* \* \*